(12) United States Patent
Marciante

(10) Patent No.: US 12,424,815 B2
(45) Date of Patent: Sep. 23, 2025

(54) METHOD AND SYSTEM FOR MULTI-WAVELENGTH LASER SYSTEM

(71) Applicant: RAM Photonics, LLC, San Diego, CA (US)

(72) Inventor: John R. Marciante, Webster, NY (US)

(73) Assignee: RAM Photonics Industrial, LLC, Webster, NY (US)

(*) Notice: Subject to any disclaimer, the term of this patent is extended or adjusted under 35 U.S.C. 154(b) by 787 days.

(21) Appl. No.: 17/582,312

(22) Filed: Jan. 24, 2022

(65) Prior Publication Data

US 2022/0239054 A1    Jul. 28, 2022

Related U.S. Application Data

(60) Provisional application No. 63/140,704, filed on Jan. 22, 2021.

(51) Int. Cl.
*H01S 3/23* (2006.01)
*H01S 3/067* (2006.01)
*H01S 3/30* (2006.01)

(52) U.S. Cl.
CPC ............ *H01S 3/2391* (2013.01); *H01S 3/067* (2013.01); *H01S 3/302* (2013.01)

(58) Field of Classification Search
CPC .. H01S 3/2391; H01S 3/08022; H01S 3/1053; H01S 3/139; H01S 3/06704;
(Continued)

(56) References Cited

U.S. PATENT DOCUMENTS 4,791,644 A   12/1988  Dube
6,212,310 B1*  4/2001  Waarts ................. H04B 10/291
                                                         385/127
(Continued)

FOREIGN PATENT DOCUMENTS

CN    106785843 A  *  5/2017  ......... H01S 3/06708
CN    109038192 A  * 12/2018
(Continued)

OTHER PUBLICATIONS

Application No. PCT/US2022/013465, International Search Report and Written Opinion Mailed on Jun. 16, 2022, 17 pages.
(Continued)

*Primary Examiner* — Minsun O Harvey
*Assistant Examiner* — Alexander Ehrlich
(74) *Attorney, Agent, or Firm* — KILPATRICK TOWNSEND & STOCKTON LLP

(57) ABSTRACT

A multi-wavelength laser system includes a first fiber laser having a first cavity mirror and a first output coupler, a first optical coupler configured to receive light from the first output coupler, a second fiber laser having a second cavity mirror and a second output coupler, and a second optical coupler configured to receive light from the second output coupler. The multi-wavelength laser system also includes a spectral beam combiner configured to receive first output light from the first optical coupler, receive second output light from the second optical coupler, combine the first output light and the second output light, and form a multi-wavelength output beam.

20 Claims, 18 Drawing Sheets

(58) Field of Classification Search
CPC .. H01S 3/094007; H01S 3/0675; H01S 3/005; H01S 3/1028; H01S 2301/03; H01S 3/067; H01S 3/302; H01S 3/0401; H01S 3/1055; H01S 3/08086; G02B 6/2852
See application file for complete search history.

(56) References Cited

U.S. PATENT DOCUMENTS

| | | | |
|---|---|---|---|
| 7,199,924 | B1 * | 4/2007 | Brown ................ H01S 3/2383 398/87 |
| 9,293,889 | B1 | 3/2016 | Henry et al. |
| 10,365,167 | B2 | 7/2019 | Hockaday |
| 11,960,130 | B2 | 4/2024 | Marciante |
| 2004/0208580 | A1 | 10/2004 | Zhao |
| 2006/0285813 | A1 | 12/2006 | Ferguson |
| 2007/0064756 | A1 * | 3/2007 | Kashyap ............... G02F 1/0147 372/43.01 |
| 2007/0092182 | A1 | 4/2007 | Kobayashi et al. |
| 2007/0211772 | A1 | 9/2007 | Romano et al. |
| 2008/0198880 | A1 * | 8/2008 | Munroe ................ H01S 3/042 372/6 |
| 2009/0046746 | A1 * | 2/2009 | Munroe .............. H01S 3/06758 359/328 |
| 2009/0169150 | A1 | 7/2009 | Xia |
| 2011/0038635 | A1 | 2/2011 | Bai |
| 2011/0128655 | A1 | 6/2011 | Hochlehnert et al. |
| 2011/0249979 | A1 | 10/2011 | Sheng et al. |
| 2014/0023098 | A1 | 1/2014 | Clarkson et al. |
| 2018/0100978 | A1 | 4/2018 | Kim et al. |
| 2019/0341739 | A1 | 11/2019 | Loh et al. |
| 2021/0313758 | A1 * | 10/2021 | Rockwell ............. H01S 3/0941 |
| 2022/0236501 | A1 | 7/2022 | Marciante |

FOREIGN PATENT DOCUMENTS

| | | | | |
|---|---|---|---|---|
| EP | 1241746 | A1 * | 9/2002 | ....... H01S 3/094015 |
| JP | 2008197301 | A | 8/2008 | |
| WO | WO-2008064874 | A1 * | 6/2008 | ............ B82Y 20/00 |
| WO | 2016069744 | A1 | 5/2016 | |
| WO | WO-2018001442 | A1 * | 1/2018 | ........... H01S 3/0621 |
| WO | 2018044500 | A1 | 3/2018 | |

OTHER PUBLICATIONS

Application No. PCT/US2022/013466, International Search Report and Written Opinion Mailed on Jun. 14, 2022, 20 Pages.
U.S. Appl. No. 17/582,293 , "Non-Final Office Action", Sep. 8, 2023, 9 pages.
International Patent Application No. PCT/US2022/013465 , "International Preliminary Report on Patentability", Aug. 3, 2023, 14 pages.
International Patent Application No. PCT/US2022/013466 , "International Preliminary Report on Patentability", Aug. 3, 2023, 16 pages.
PCT/US2022/013465 , "Invitation to Pay Additional Fees and, Where Applicable, Protest Fee", Mar. 31, 2022, 2 pages.
PCT/US2022/013466 , "Invitation to Pay Additional Fees and, Where Applicable, Protest Fee", Mar. 31, 2022, 2 pages.
U.S. Appl. No. 17/582,293, "Notice of Allowance", Dec. 22, 2023, 8 pages.
U.S. Appl. No. 18/614,520, "Notice of Allowance", Oct. 23, 2024, 9 pages.
EP22743310.9, "Extended European Search Report", Nov. 8, 2024, 12 pages.
EP22743311.7, "Extended European Search Report", Dec. 5, 2024, 9 pages.
Limpert et al., "The Rising Power of Fiber Lasers and Amplifiers", Institute of Electrical and Electronics Engineers Journal of Selected Topics in Quantum Electronics, vol. 13, No. 3, May-Jun. 2007, pp. 537-545.
Supradeepa, "Stimulated Brillouin Scattering Thresholds in Optical Fibers for Lasers Linewidth Broadened with Noise", Optics Express, vol. 21, No. 4, Feb. 25, 2013, pp. 4677-4687.

\* cited by examiner

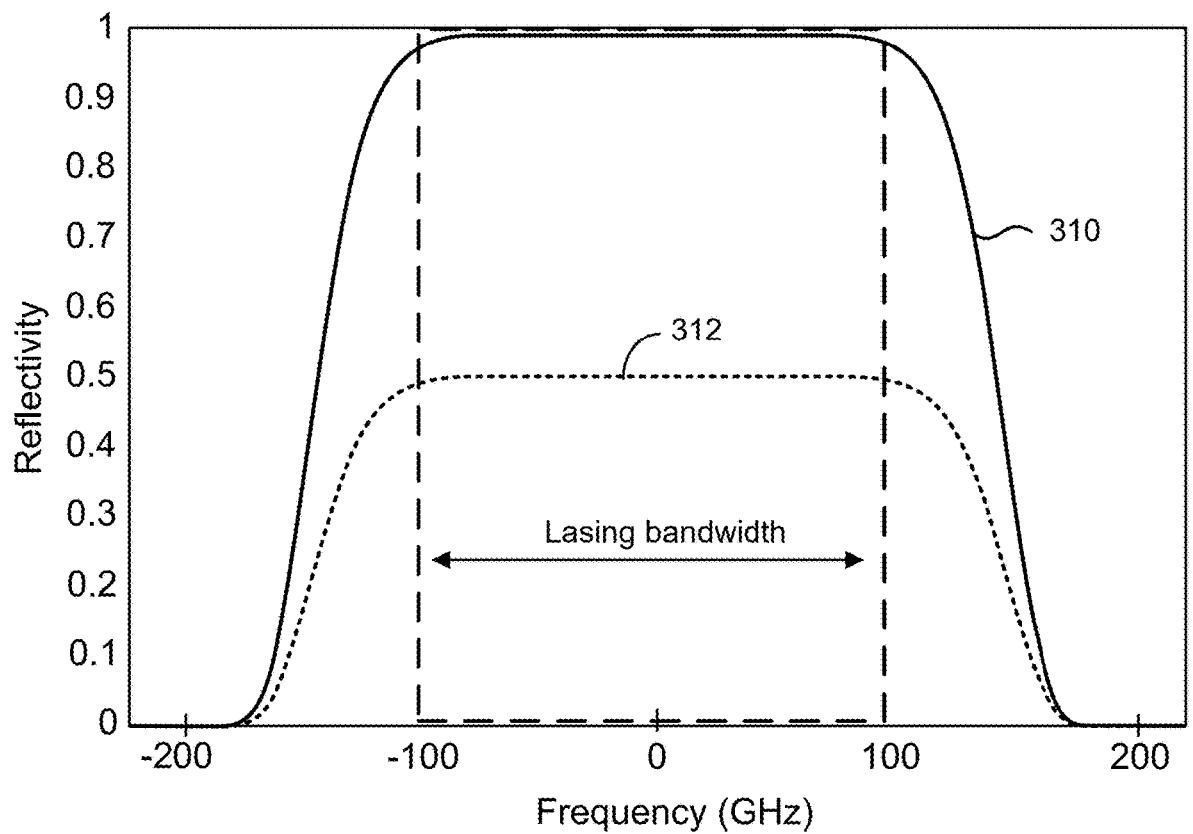
FIG. 3A – Prior Art

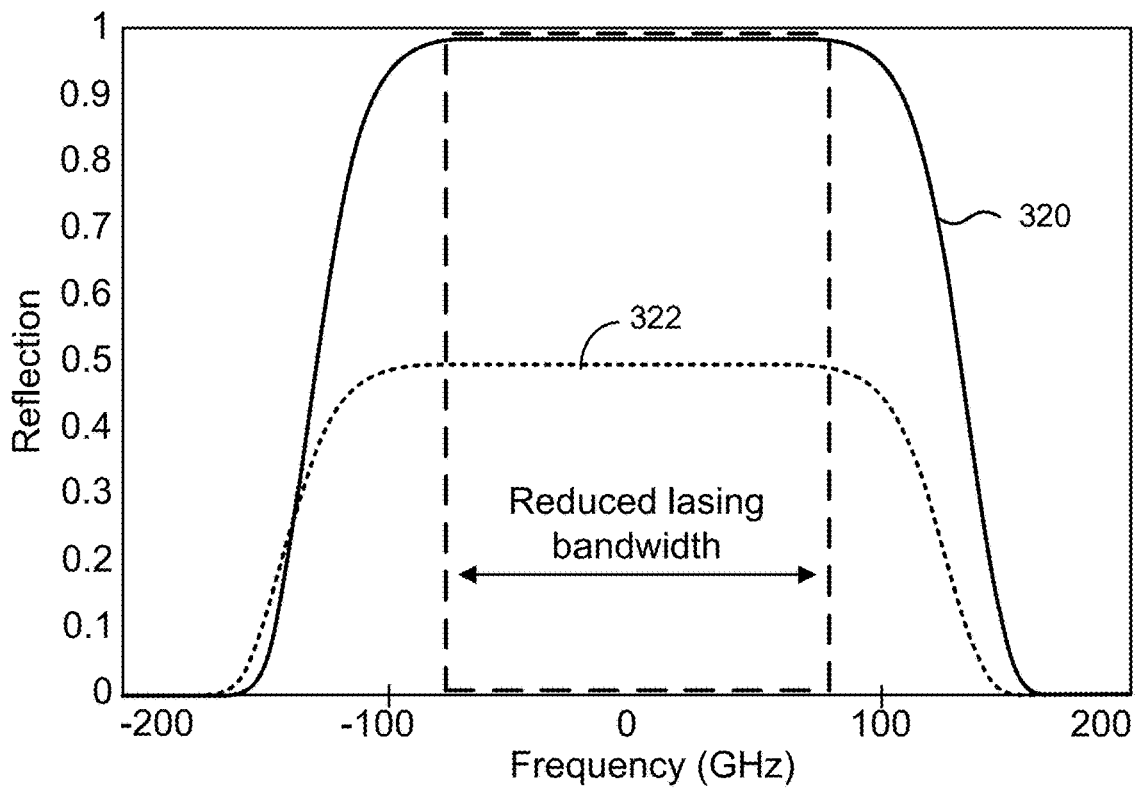
FIG. 3B – Prior Art
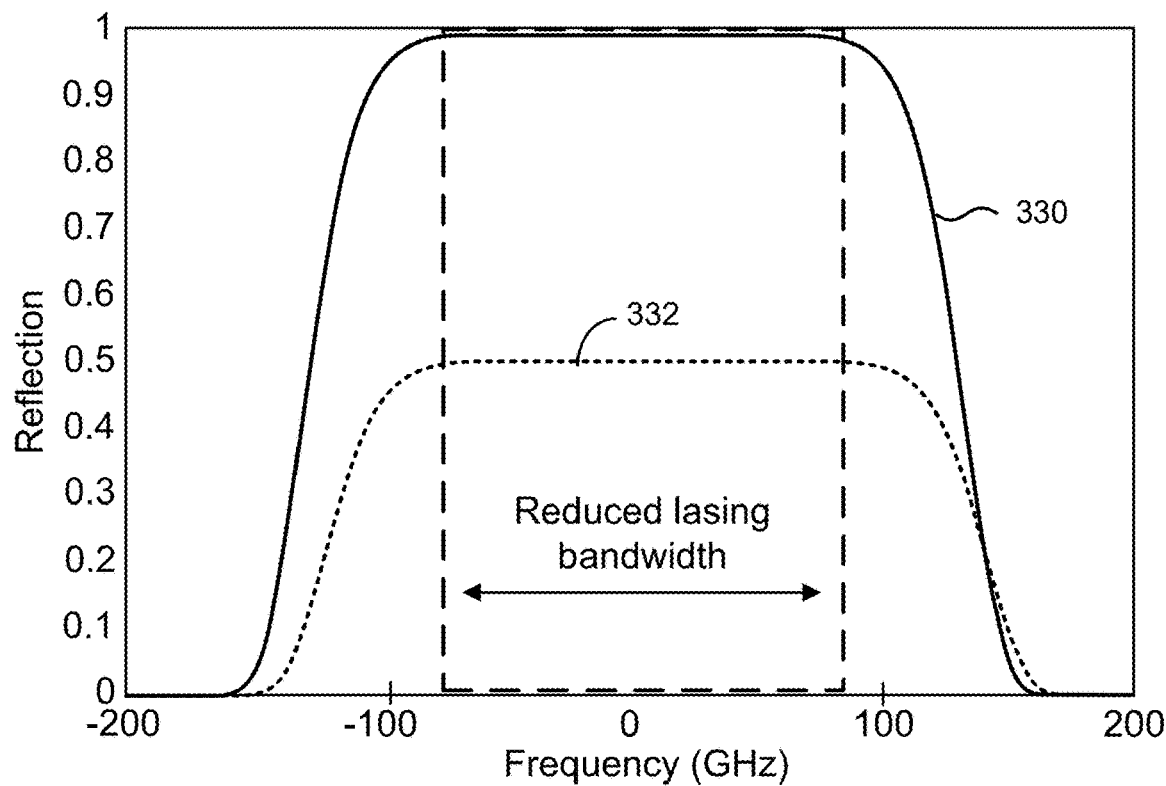
FIG. 3C – Prior Art

METHOD AND SYSTEM FOR MULTI-WAVELENGTH LASER SYSTEM

CROSS-REFERENCE TO RELATED APPLICATIONS

This application claims the benefit of U.S. Provisional Application No. 63/140,704, filed Jan. 22, 2021, the contents of which are hereby incorporated by reference in their entirety for all purposes.

The following regular U.S. patent applications (including this one) are being filed concurrently, and the entire disclosure of the other application is incorporated by reference into this application for all purposes:

application Ser. No. 17/582,312, filed Jan. 24, 2022, entitled "METHOD AND SYSTEM FOR MULTI-WAVELENGTH LASER SYSTEM"; and.

application Ser. No. 17/583,293, filed Jan. 24, 2022, entitled "METHOD AND SYSTEM FOR STABILIZING FIBER GRATING OPTICAL PARAMETERS".

BACKGROUND OF THE INVENTION

Fiber lasers are characterized by a broad gain bandwidth, for example, on the order of 40,000 GHz, which enables lasing over a wide range of optical wavelengths. Although fiber lasers can generate high power levels, a number of nonlinear optical effects are encountered when operating fiber lasers at high power.

Despite the progress made in the development of fiber laser systems, there is a need in the art for improved methods and systems related to laser systems.

SUMMARY OF THE INVENTION

The present disclosure relates generally to methods and systems related to laser systems that emit light at multiple wavelengths. More particularly, embodiments of the present invention provide methods and systems that emit laser light at multiple wavelengths for use in spectral beam combining applications. In a particular embodiment, the output from multiple lasers, each emitting multiple longitudinal modes, also referred to as spectral modes, is combined using a spectral beam combiner to provide a high power, broadband laser beam. The disclosure is applicable to a variety of applications in lasers and optics, including fiber laser implementations.

According to an embodiment of the present invention, a multi-wavelength laser system is provided. The multi-wavelength system includes a first fiber laser having a first cavity mirror and a first output coupler. A first longitudinal mode spacing associated with the first fiber laser is on the order of 50 MHz and a first SBS spectral response associated with the first fiber laser is on the order of 20 MHz. The first cavity mirror and the first output coupler are characterized by a first reflection bandwidth on the order of 10 GHz, thereby supporting approximately 200 longitudinal modes. The multi-wavelength system also includes a first optical coupler connected to the first output coupler and a second fiber laser having a second cavity mirror and a second output coupler. A second longitudinal mode spacing associated with the second fiber laser is on the order of 50 MHz and a second SBS spectral response associated with the second fiber laser is on the order of 20 MHz. The second cavity mirror and the second output coupler are characterized by a second reflection bandwidth on the order of 10 GHz, thereby supporting 200 longitudinal modes.

The multi-wavelength system further includes a second optical coupler connected to the second output coupler and a spectral beam combiner configured to receive first output light from the first optical coupler, receive second output light from the second optical coupler, combine the first output light and the second output light, and form a multi-wavelength output beam.

According to another embodiment of the present invention, a multi-wavelength laser system is provided. The multi-wavelength laser system includes a first fiber laser having a first cavity mirror and a first output coupler and a first optical coupler configured to receive light from the first output coupler. The multi-wavelength laser system also includes a second fiber laser having a second cavity mirror and a second output coupler, a second optical coupler configured to receive light from the second output coupler, and a spectral beam combiner configured to receive first output light from the first optical coupler, receive second output light from the second optical coupler, combine the first output light and the second output light, and form a multi-wavelength output beam.

According to a specific embodiment of the present invention, a multi-wavelength laser system is provided. The multi-wavelength laser system includes a first fiber laser including a first fiber Bragg grating (FBG) cavity mirror and a first FBG output coupler, a first fused fiber beam splitter having a first input connected to the first FBG output coupler, a first laser output, and a first control output, a first fiber link connected to the first laser output of the first fused fiber beam splitter, and a second fiber link connected to the first control output of the first fused fiber beam splitter. The multi-wavelength laser system also includes a second fiber laser including a second fiber Bragg grating (FBG) cavity mirror and a second FBG output coupler, a second fused fiber beam splitter having a second input connected to the second FBG output coupler, a second laser output, and a second control output, a third fiber link connected to the second laser output of the second fused fiber beam splitter, and a fourth fiber link connected to the second control output of the second fused fiber beam splitter. The multi-wavelength laser system further includes a spectral beam combiner connected to the first fiber link and the second fiber link.

In some embodiments, no gain is present between the first FBG output coupler and the spectral beam combiner and between the second FBG output coupler and the spectral beam combiner. The first fiber laser can be characterized by an SBS spectral response width and a longitudinal mode spacing greater than the SBS spectral response width. The SBS spectral response width can be characterized by a FWHM of approximately 20 MHZ and the longitudinal mode spacing is approximately 50 MHz. The first fiber laser and the second fiber laser can be characterized by a lasing bandwidth greater than an SBS spectral response width. The first laser output can include between 100 and 300 longitudinal modes, for example, approximately 200 longitudinal modes.

According to another specific embodiment of the present invention, a method of producing a broadband output beam from a plurality of laser oscillators is provided. The method includes providing a first laser oscillator of the plurality of laser oscillators. The first laser oscillator has a first cavity mirror and a first output coupler. The method also includes generating a first laser output including at least 50 longitudinal modes, receiving the first laser output at a spectral beam combiner, and providing a second laser oscillator of the plurality of laser oscillators. The second laser oscillator has a second cavity mirror and a second output coupler. The method further includes generating a second laser output including at least 50 longitudinal modes, receiving the second laser output at the spectral beam combiner, combining at least a portion of the first laser output and the second laser output, and outputting the broadband output beam.

In some embodiments, no gain is present between the first output coupler and the spectral beam combiner and between the second output coupler and the spectral beam combiner. The first laser output can be characterized by a first longitudinal mode spacing on the order of 50 MHz and a first SBS spectral response on the order of 20 MHz. The second laser output can be characterized by a second longitudinal mode spacing on the order of 50 MHz and a second SBS spectral response on the order of 20 MHz. The first laser output can include approximately 200 longitudinal modes and the second laser output can include approximately 200 longitudinal modes. The first laser oscillator can be characterized by an SBS spectral response width and a longitudinal mode spacing greater than the SBS spectral response width. The first laser output can include between 100 and 300 longitudinal modes, for example, approximately 200 longitudinal modes.

According to a specific embodiment, a laser is provided. The laser includes a fiber Bragg grating (FBG) cavity mirror disposed in a first thermo-mechanical housing, a dual-clad fiber coupled to the FBG cavity mirror, an FBG output coupler disposed in a second thermo-mechanical housing and coupled to the dual-clad fiber, and an optical tap having an input optical fiber coupled to the FBG output coupler, a laser output optical fiber, and a control output optical fiber. The optical tap includes a fiber splice between the input optical fiber and the laser output optical fiber and the control output optical fiber is placed adjacent the fiber splice. In an embodiment, the control output optical fiber is operable to receive light scattered from the fiber splice. The laser can also include a pump coupled to the FBG cavity mirror. The laser can also include a control system coupled to the control output optical fiber. The control system can include a splitter coupled to the control output optical fiber, a reference FBG coupled to the splitter, a termination coupled to the reference FBG, a reference detector coupled to the splitter, a signal detector coupled to the splitter and operable to receive light reflected from reference FBG, and a controller.

According to another specific embodiment of the present invention, an oscillator is provided. The oscillator includes a pump, a fiber Bragg grating (FBG) cavity mirror coupled to the pump and disposed in a first thermo-mechanical housing, and a dual-clad fiber coupled to the FBG cavity mirror. The oscillator also includes an FBG output coupler disposed in a second thermo-mechanical housing and coupled to the dual-clad fiber and a first temperature sensor cable coupled to the first thermo-mechanical housing. The oscillator further includes a first control cable coupled to the first thermo-mechanical housing, a second temperature sensor cable coupled to the second thermo-mechanical housing, a second control cable coupled to the second thermo-mechanical housing, and a controller coupled to the first temperature sensor cable, the first control cable, the second temperature sensor cable, and the second control cable.

Numerous benefits are achieved by way of the present disclosure over conventional techniques. For example, embodiments of the present disclosure, by using individual oscillators to provide inputs for a spectral beam combiner, provide for independent wavelength control of each of the individual oscillators. Moreover, thermal mode instability (TMI) and stimulated Brillouin scattering (SBS) are reduced by embodiments of the present invention through control of the linewidth of the individual oscillators while still enabling spectral combination. Furthermore, by reducing the number of elements in the laser system in comparison with conventional systems, embodiments of the present invention reduce the number of failure modes. These and other embodiments of the disclosure, along with many of its advantages and features, are described in more detail in conjunction with the text below and corresponding figures.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete and will fully convey the full scope to those skilled in the art.

FIG. 3A is a plot illustrating reflection spectra for cavity mirrors in a conventional laser.

FIG. 3B is a plot illustrating reflection spectra for cavity mirrors with fabrication errors in a conventional laser.

FIG. 3C is a plot illustrating reflection spectra for cavity mirrors with temperature variation in a conventional laser.

DETAILED DESCRIPTION OF SPECIFIC EMBODIMENTS

The present disclosure relates generally to methods and systems related to laser systems that emit light at multiple wavelengths. More particularly, embodiments of the present invention provide methods and systems that emit laser light at multiple wavelengths for use in spectral beam combining applications. In a particular embodiment, the output from multiple lasers, each emitting multiple longitudinal modes, is combined using a spectral beam combiner to provide a high power, broadband laser beam. The disclosure is applicable to a variety of applications in lasers and optics, including fiber laser implementations.

Figure 1:
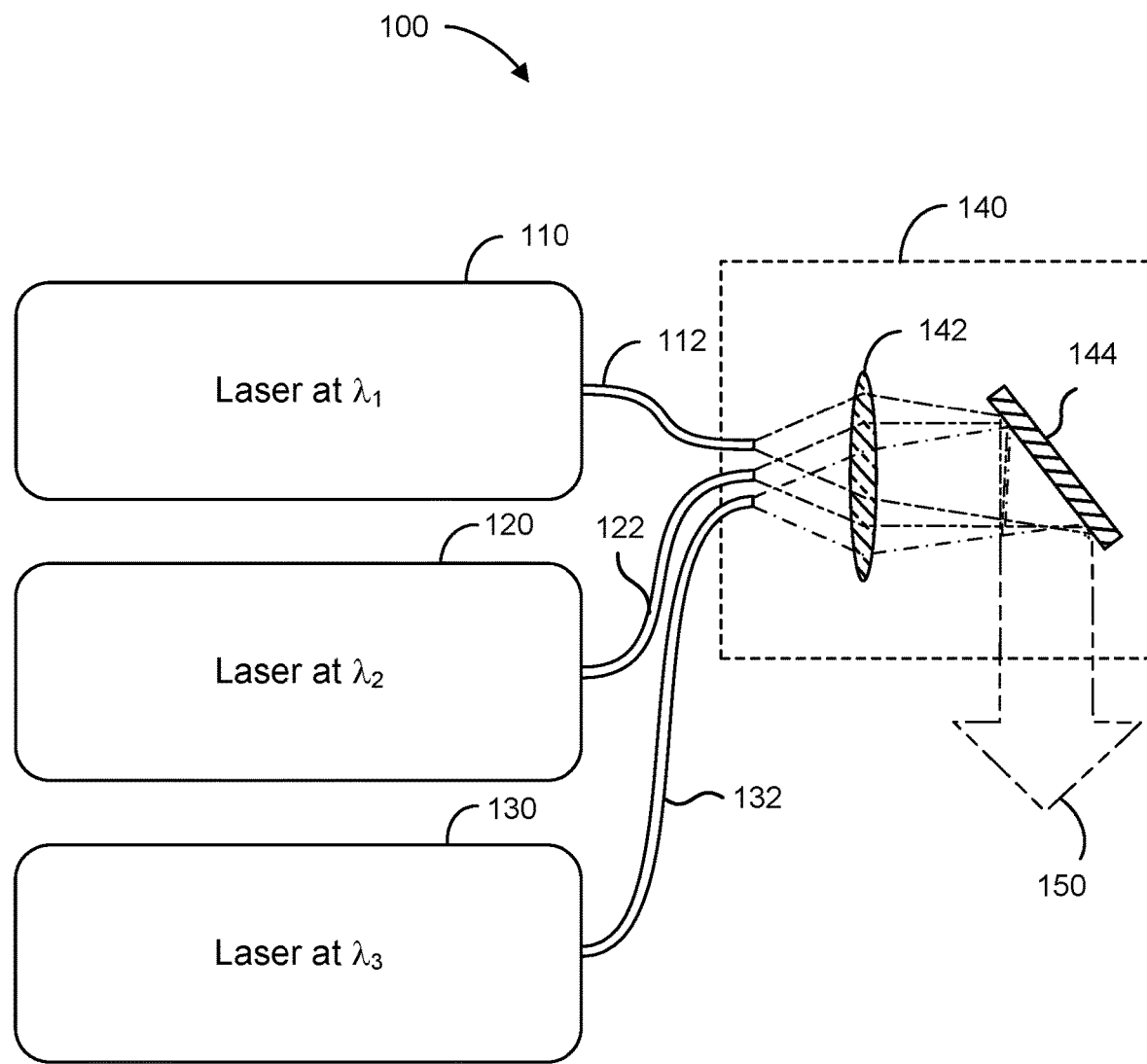
FIG. 1 is a simplified schematic diagram of a multi-wavelength laser system according to an embodiment of the present invention.

FIG. 1 is a simplified schematic diagram of a multi-wavelength laser system 100 according to an embodiment of the present invention. As illustrated in FIG. 1, a plurality of oscillators illustrated as oscillator 110, oscillator 120 and oscillator 130, generate laser outputs that are spectrally combined using spectral beam combiner 140. Each of oscillators 110, 120, and 130 can also be referred to as lasers or independent lasers and can be implemented as fiber lasers. Additional description related to oscillators 110, 120, and 130 will be provided in relation to FIG. 2A.

The output from each oscillator is directed to spectral beam combiner 140 using a fiber link. As illustrated in FIG. 1, fiber link 112 couples light from oscillator 110 to spectral beam combiner 140, fiber link 122 couples light from oscillator 120 to spectral beam combiner 140, and fiber link 132 couples light from oscillator 130 to spectral beam combiner 140. Spectral beam combiner 140 receives light from each of oscillators 110/120/130 and uses one or more optical elements 142 and refractive or diffractive structures, for example, diffraction grating 144, to combine the light from oscillators 110/120/130 and form broadband output beam 150.

In the embodiment illustrated in FIG. 1, oscillators 110/120/130 are individual and independent oscillators that do not include a separate amplifier. In contrast with master-oscillator power-amplifier (MOPA) systems, embodiments of the present invention utilize laser outputs from a plurality of oscillators as inputs into a spectral beam combining system. Because independent laser oscillators, for example, oscillators 110, 120, and 130, are utilized in the embodiments described herein, the independent oscillators are resistant to failure modes that are present in a MOPA architecture. As an example, in a MOPA architecture, if the master oscillator fails, the likelihood is high that the fiber power amplifiers will be destroyed as a result of self-pulsations since, in the absence of a master oscillator signal to amplify, the pump light delivered to the amplifiers, which are in an inverted state, will produce potentially destructive self-pulsations. Embodiments of the present invention, since they do not utilize an amplifier in the optical path between the oscillator and the spectral beam combiner, do not suffer from these failure mechanisms. Moreover, embodiments of the present invention utilize oscillators that operate at power levels sufficient for beam combining applications, whereas MOPA systems, by design, use a low power master oscillator and rely on one or more amplifiers to achieve desired power levels. Moreover, the power amplifiers utilized in MOPA systems are susceptible to TMI that limits or prohibits high power operation.

In embodiments of the present invention, graceful degradation is provided since, if one of the oscillators fails, the spectral content provided by the failed oscillator will be lost, but the multi-wavelength laser system will still function, albeit with a missing spectral band. As an example, if one of the oscillators drifts in wavelength, the spectrally combined beam could be missing the desired wavelength. Alternatively, if a pump for an oscillator fails, the oscillator will stop lasing, resulting in the spectrally combined beam lacking the power associated with the failed oscillator. However, all of these failure modes enable graceful degradation. In contrast with MOPA systems, embodiments of the present invention utilize individual oscillators in which the output from the oscillator is provided to the spectral beam combiner without additional amplification before being combined at the spectral beam combiner. Utilizing the architecture discussed in relation to FIG. 2A, embodiments of the present invention combine the outputs from individual oscillators in the spectral beam combiner at power levels that are suitable for a variety of applications.

Embodiments of the present invention can also be contrasted with external cavity systems that utilize gain units with antireflection coated surfaces, e.g., facets, and an external reflector to provide feedback. In the embodiments described herein, each oscillator is an independent oscillator including a cavity mirror and an output coupler and does not rely on external feedback to produce lasing. One of ordinary skill in the art would recognize many variations, modifications, and alternatives.

Although only three oscillators 110/120/130 are illustrated in FIG. 1 for purposes of clarity, it will be appreciated that fewer (e.g., two) oscillators or additional (e.g., greater than three) oscillators can be utilized depending on the particular application. As an example, if a given number of wavelength bands (e.g., N bands) are to be combined in the multi-wavelength beam, a corresponding number (i.e., N) oscillators can be utilized in the multi-wavelength laser system. One of ordinary skill in the art would recognize many variations, modifications, and alternatives.

Using independent oscillators 110/120/130, embodiments of the present invention provide independent wavelength control of each of the oscillators. As described more fully in relation to FIG. 5, lasing at multiple longitudinal modes enable suppression of TMI and the ability to achieve high power operation. Moreover, as described more fully in relation to FIG. 6, control of the linewidth of the laser light produced by each oscillator enables suppression of SBS by producing laser light that can be characterized by a spectral separation between adjacent longitudinal modes that is greater than the SBS spectral response.

Figure 2A:
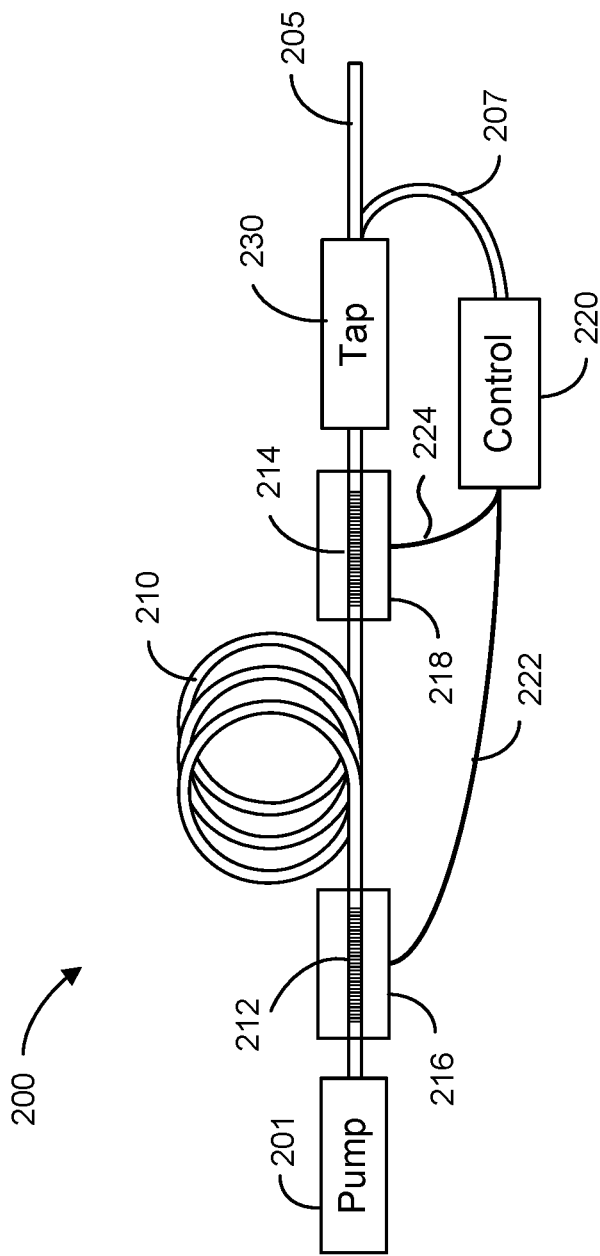
FIG. 2A is a simplified schematic diagram of an oscillator according to an embodiment of the present invention.

FIG. 2A is a simplified schematic diagram of an oscillator according to an embodiment of the present invention. In some embodiments, similar elements are utilized in each of oscillators 110, 120, and 130, with modification of the elements as appropriate to the particular oscillator.

Referring to FIG. 2A, oscillator 200, which can be utilized as any of oscillators 110, 120, or 130 shown in FIG. 1, includes a dual-clad fiber 210. Gain in dual-clad fiber 210 is provided via pump 201, which is illustrated as directing pump light through cavity mirror 212 in this embodiment. In other embodiments, other pump methods are utilized as appropriate to the particular application. In some embodiments, in order to provide high power output, a dual-clad fiber with an octagonal cross section and a cladding width of approximately 400 µm can be utilized. In other implementations, other geometries, including oval, hexagonal, oscillating outer diameter, and the like can be utilized. Additionally, other fiber sizes can be utilized and embodiments of the present invention are not limited to the use of an octagonal fiber with a cladding dimension of 400 µm. One of ordinary skill in the art would recognize many variations, modifications, and alternatives.

Figure 3D:
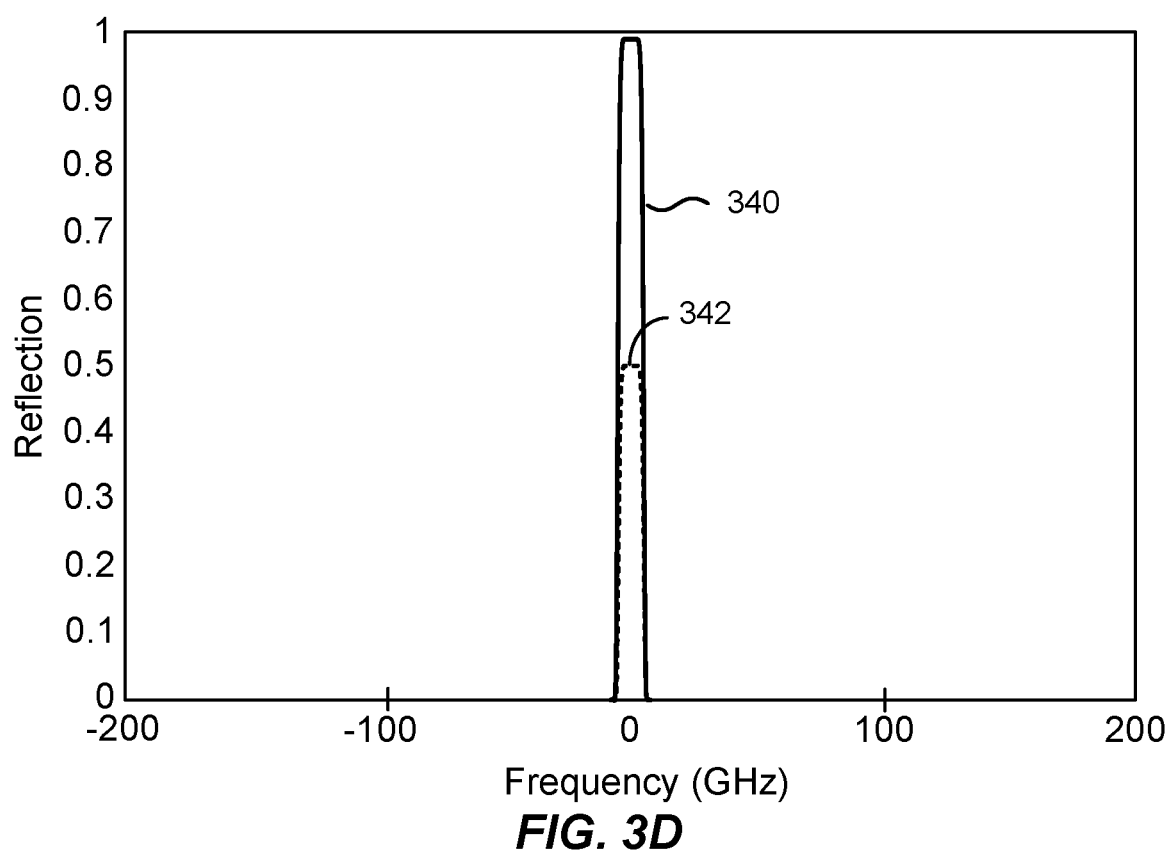
FIG. 3D is a plot illustrating reflection spectra for cavity mirrors in an oscillator according to an embodiment of the present invention.

Feedback for oscillator 200 is provided using cavity mirror 212 and output coupler 214. In an embodiment, cavity mirror 212 is a high reflectivity fiber Bragg grating (FBG) having a spectral reflectivity profile as illustrated in FIG. 3D. Similarly, output coupler 214 can be implemented as a low reflectivity FBG having a spectral reflectivity profile as illustrated in FIG. 3D.

Cavity mirror 212 is enclosed in thermo-mechanical housing 216 and output coupler 214 is enclosed in thermo-mechanical housing 218. Utilizing a thermo-mechanical housing for the cavity mirror and the output coupler enables the temperature of the cavity mirror and the output coupler to be controlled to predetermined tolerances. Since the index of refraction of a fiber including a FBG varies as a function of temperature, precise temperature control is an element of control of the FBG reflection profile, i.e., the center frequency and bandwidth of the reflection profile. Additionally, the thermo-mechanical housing provides mechanical functionality that can be used in controlling the FBG reflection profile, i.e., the center frequency and bandwidth of the reflection profile. As an example, in one embodiment, piezoelectric stretching or compression of the fiber including the FBG can be used change the length of the grating pattern, thereby controlling the FBG reflection profile. In some embodiments, use of thermo-mechanical housing 216 in conjunction with cavity mirror 212 and thermo-mechanical housing 218 in conjunction with output coupler 214 enables the center frequency of the reflection profile to be controlled in a sub-MHz range.

Referring to FIG. 2A, optical tap 230, which can also be referred to as an optical coupler, is optically coupled to output coupler 214 and includes a first output that is optically coupled to fiber link 205, which can be compared to fiber links 112/122/132 in FIG. 1. Additionally, optical tap 230 includes a second output that is optically coupled to control system 220 via fiber link 207. Control system 220 is, in turn, in communication with thermo-mechanical housing 216 via feedback link 222 and with thermo-mechanical housing 218 via feedback link 224. Optical tap 230, which can also be referred to as an optical tap or a tap, can be implemented as a fused fiber beam splitter with a predetermined split ratio, for example, 99% output to fiber link 205 and 1% fed back to control system 220 via fiber link 207. In other embodiments different split ratios are utilized depending on the particular application.

Thus, laser light emitted by output coupler 214 is received at optical tap 230, which can be implemented as a fiber coupler. A portion of the laser light is output for use by the spectral beam combiner via fiber link 205 and another portion is provided via fiber link 207 to control system 220, which provides feedback signals used to control and operate thermo-mechanical housing 216 and thermo-mechanical housing 218. In some embodiments, there is an attenuator between the optical tap 230 and the control system 220. Control system 220 can monitor the center frequency of the laser emission and provide inputs to thermo-mechanical housing 216 and thermo-mechanical housing 218 in order to control the center frequency of cavity mirror 212 and/or output coupler 214. As an example, the center frequency of the laser emission can be stabilized using control system 220 in conjunction with thermo-mechanical housing 216 and thermo-mechanical housing 218 at levels on the order of tens of megahertz, for example, on the order of 20 MHz. Given a FBG reflection profile with a bandwidth of 10 GHz, stabilization of the center frequency in a range of 20 MHz will provide sufficient control to enable spectral beam combination. One skilled in the art will recognize that FIG. 2A is a simplified diagram of a laser, which would normally include additional components such as cladding pump light strippers, mode field adaptors, and the like, as well as fusion splices between the various fibers and fiberized components.

Additionally, the center wavelength of the laser emission can be used in tuning the center wavelength of each oscillator that is coupled to spectral beam combiner 140. As an example, tuning of the center wavelength of each oscillator by a value on the order of several nanometers, for example ~1 nm, can be accomplished to ensure that each oscillator contributes light in a predetermined wavelength band as appropriate for spectral beam combination.

Figure 2B:
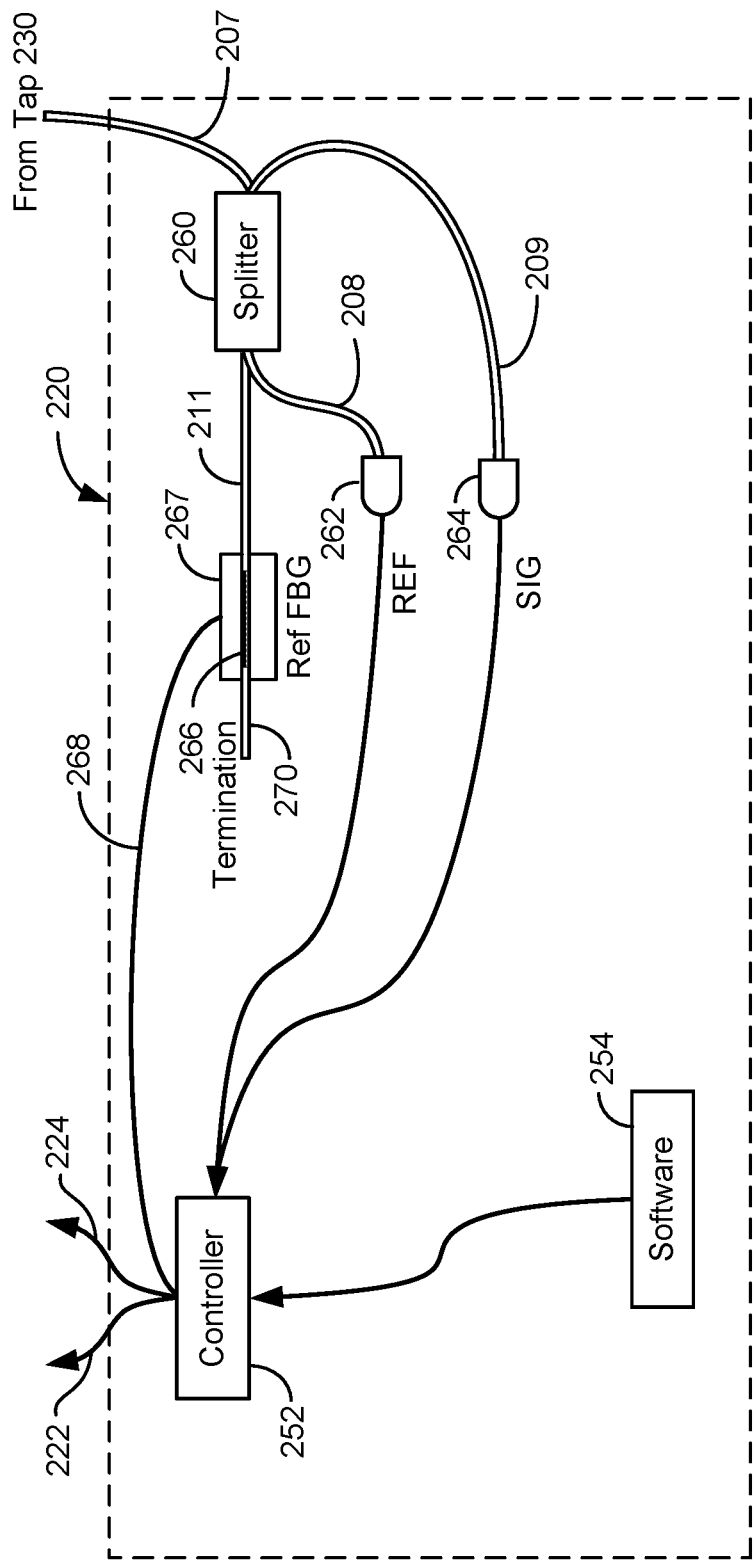
FIG. 2B is a simplified schematic diagram of control elements of the oscillator illustrated in FIG. 2A according to an embodiment of the present invention.

FIG. 2B is a simplified schematic diagram of control elements of the oscillator illustrated in FIG. 2A according to an embodiment of the present invention. In FIG. 2B, elements are illustrated that can be used to implement control system 220 illustrated in FIG. 2A. Referring to FIG. 2B, a reference FBG 266, which is disposed in a temperature controlled environment, for example, an environment with the temperature accurately controlled to a predetermined temperature, is used as an absolute wavelength reference. Light from optical tap 230 illustrated in FIG. 2A is received at splitter 260 using fiber link 207. In some embodiments, splitter 260 is a 50/50 splitter that equally divides the light received though fiber link 207 from optical tap 230.

A first output 208 of splitter 260 is provided to a reference detector 262, which may be a photodiode. In some embodiments, an attenuator is inserted between splitter 260 and reference detector 262. The output of reference detector 262 provides an electrical reference (REF) that can be utilized by controller 252. The second output 211 of splitter 260 is provided to reference FBG 266, which can be disposed in thermo-mechanical housing 267, i.e., a temperature controlled housing similar to thermo-mechanical housing 216 or thermo-mechanical housing 218 illustrated in FIG. 2A. The second output 211 of splitter 260 enters reference FBG 266 and is partially transmitted and partially reflected based on the characteristics of the reference optical spectrum. Transmitted light propagates to termination 270, which prohibits reflection toward reference FBG 266. Thus, the transmitted light is extinguished. The amount of light reflected from reference FBG 266 is governed by the spectral overlap between the optical signal spectrum characterizing the light received from the second output 211 of splitter 260 and the spectral characteristics of the reference FBG 266.

Referring to FIG. 2B, the light reflected from reference FBG 266 makes a second pass through splitter 260 and propagates through optical fiber 209 and is detected at signal detector 264, which provides an electrical signal (SIG) that, along with the electrical reference (REF) produced by reference detector 262, is utilized by controller 252. Controller 252, which may be implemented as a micro-controller, is configured to determine the ratio of the electrical signal (SIG) produced using signal detector 264 to the electrical reference (REF) produced by reference detector 262, i.e., ratio=SIG/REF. Software 254 can be utilized, for example, to change the temperature of the reference FBG 266 and thereby tune the laser wavelength. This ratio provides information on the spectral overlap between SIG and REF, which can be utilized by controller 252 to adjust operating characteristics of thermo-mechanical housing 216 and/or thermo-mechanical housing 218. Based on adjustments to thermo-mechanical housing 216 and/or thermo-mechanical housing 218, the output frequency of oscillator 200 will vary, modifying the spectral characteristics of the light from optical tap 230 propagating in fiber link 207. Moreover, an additional control signal 268 can be provided to reference FBG 266 by controller 252. Accordingly, changes in the output frequency of oscillator 200 can be controlled using the system illustrated in FIG. 2B. Thus, embodiments of the present invention enable multiple methods of tuning the oscillator output. In an embodiment, the oscillator frequency is locked to the reference FBG 266 in order to stabilize the oscillator frequency. In an alternative embodiment, the locked and stabilized laser is tuned to a different oscillator frequency by temperature tuning the reference FBG 266.

Figure 2C:
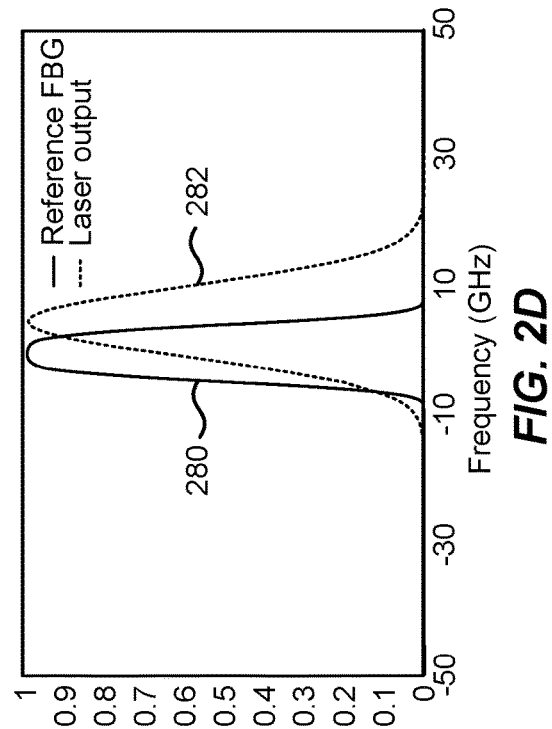
FIGS. 2C-2F are plots illustrating overlap ratios between a reference spectrum and a signal spectrum for various operating conditions according to an embodiment of the present invention.

FIGS. 2C-2F are plots illustrating how the overlap ratios between an optical reference FBG spectrum for reference FBG 266 and an optical signal spectrum coming from the splitter 260 are determined for various operating conditions according to an embodiment of the present invention. FIG. 2C is a plot illustrating maximum overlap between an optical reference spectrum 280 and an optical signal spectrum 281. In the condition illustrated in FIG. 2C, the output of oscillator 200 has a center frequency that is aligned with the center frequency of reference FBG 266.

Figure 2D:
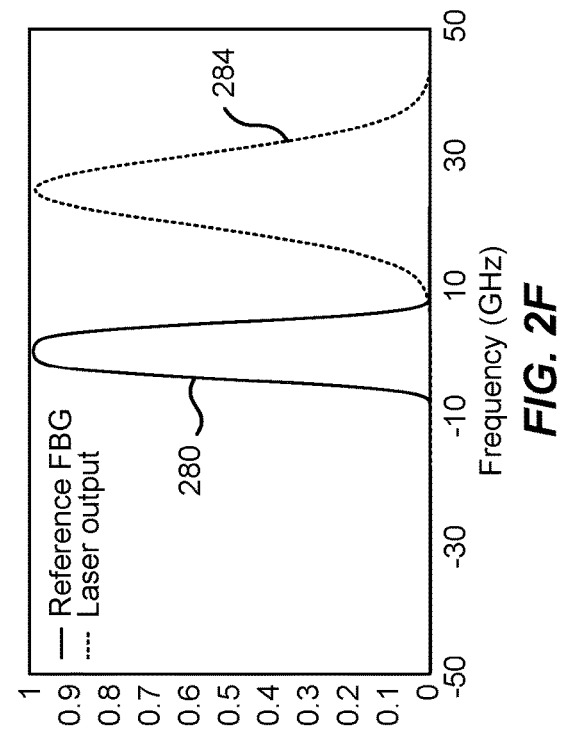

FIG. 2D is a plot illustrating a first level of mismatch between an optical reference spectrum 280 and an optical signal spectrum 282. In the condition illustrated in FIG. 2D, the output of the oscillator has a center frequency that is ~8 GHz higher than the center frequency of the reference FBG. As a result of this frequency shift, in this condition, the ratio of the electrical signal (SIG) produced using signal detector 264 to the electrical reference (REF) produced by reference detector 262 has decreased by 28%. This decrease in ratio can be utilized by controller 252 to shift the center frequency of the oscillator output to the desired frequency.

Figure 2E:
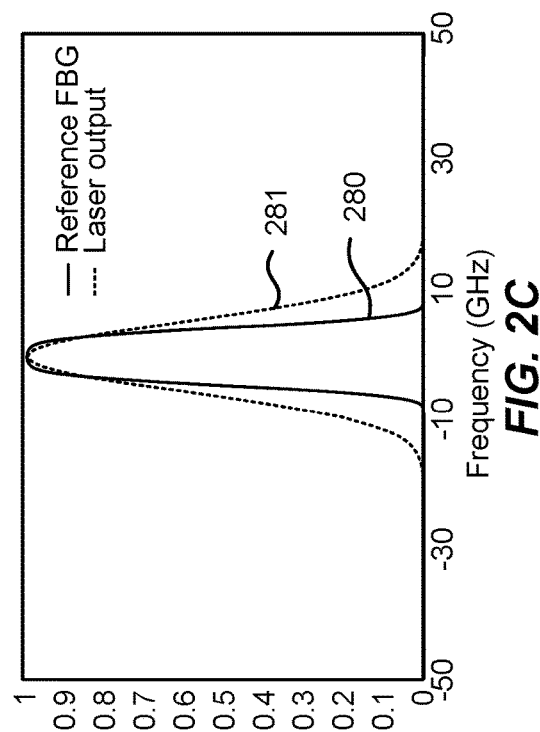

FIG. 2E is a plot illustrating a second level of mismatch between an optical reference spectrum 280 and an optical signal spectrum 283. In the condition illustrated in FIG. 2E, the output of the oscillator has a center frequency that is ~11 GHz higher than the center frequency of the reference FBG. Thus, in this condition, the ratio of the electrical signal (SIG) produced using signal detector 264 to the electrical reference (REF) produced by reference detector 262 has decreased by 74%. This decrease in ratio can be utilized by controller 252 to shift the center frequency of the oscillator output to the desired frequency.

Figure 2F:
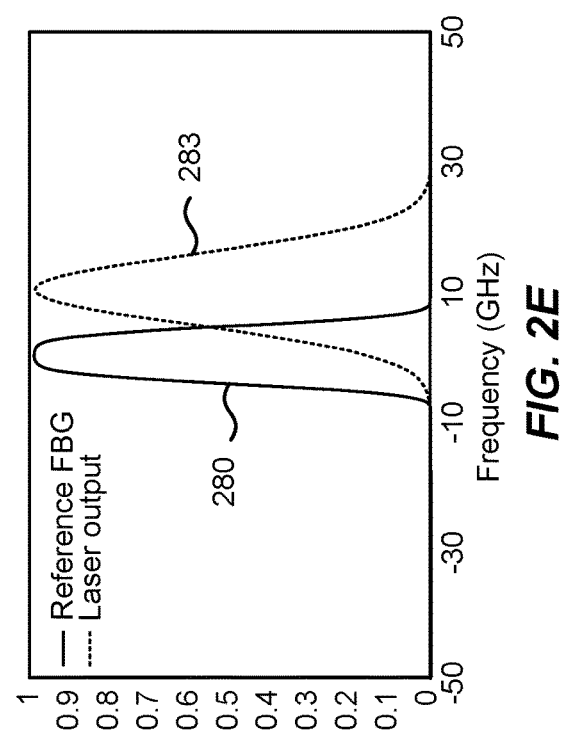

FIG. 2F is a plot illustrating a complete mismatch between an optical reference spectrum 280 and an optical signal spectrum 284. In the condition illustrated in FIG. 2F, the output of the oscillator has a center frequency that is ~25 GHz higher than the center frequency of the reference FBG. Thus, in this condition, the ratio of the electrical signal (SIG) produced using signal detector 264 to the electrical reference (REF) produced by reference detector 262 has decreased by ~100%, with substantially no overlap between reference (REF) spectrum 280 and the signal (SIG) spectrum 284, resulting in a noise-limited ratio near zero. This decrease in ratio can be utilized by controller 252 to decrease the center frequency of the oscillator output, down-shifting the signal spectrum to the desired frequency. It will be recognized that if the optical signal spectrum was mismatched by the same amount, but on the opposite (i.e., lower frequency) side of the optical reference spectrum, then the controller would increase the center frequency of the oscillator output, up-shifting the optical signal spectrum to the desired frequency.

In some embodiments, rather than operating at maximum overlap as illustrated in FIG. 2C, the oscillator is operated at a ratio less than one. As an example, the oscillator can be operated at a center frequency higher than the center frequency of the reference FBG as illustrated in FIG. 2D or 2E. In these cases, the change in ratio as a function of frequency mismatch, which can be considered as the slope of the ratio to frequency mismatch, is near the largest value associated with the system. Operation in this condition results in high sensitivity, for example, the highest sensitivity, and, as a result, tight frequency control.

Embodiments of the present invention provide a number of benefits in comparison with conventional techniques. As an example, embodiments of the present invention enable automated setting of laser wavelength, for instance, after the reference FBG 266 is characterized, for example, in an offline characterization process. Moreover, some embodiments enable laser tuning in response to tuning of reference FBG 266. In these embodiments, separate calibration processes can be utilized to calibrate reference FBG 266.

Figure 2G:
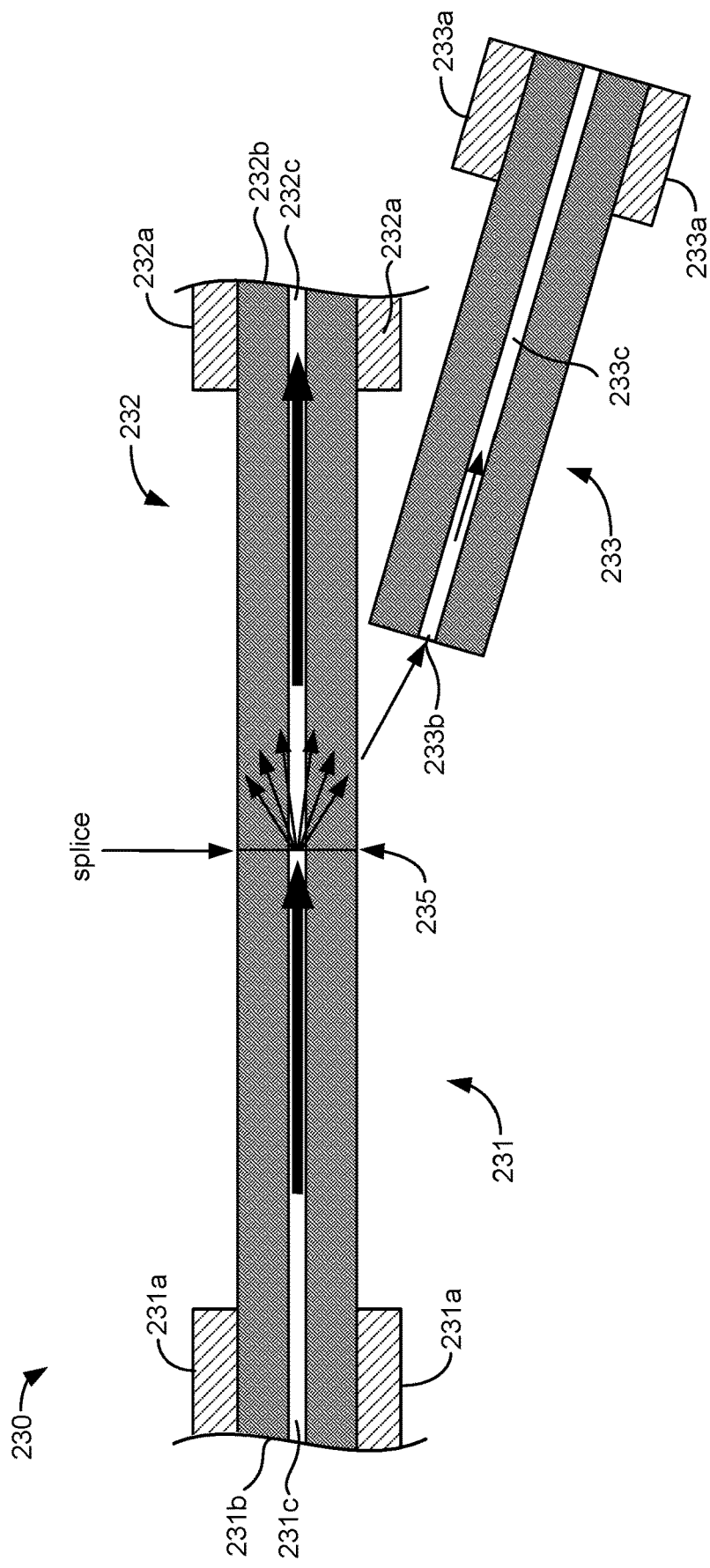
FIG. 2G is a simplified schematic diagram of a tap according to an embodiment of the present invention.

FIG. 2G is a simplified schematic diagram of an optical tap according to an embodiment of the present invention. As an exemplary embodiment, FIG. 2G provides one implementation of optical tap 230 illustrated in FIG. 2A. The optical tap 230 operates on the principle that a bare fiber can collect stray light produced at a fiber splice. Referring to FIG. 2G, optical tap 230 includes an input from a first optical fiber 231 that is spliced to a second optical fiber 232 at fiber splice 235. In the region of fiber splice 235, coating 231a of first optical fiber 231 and coating 232a of second optical fiber 232 have been removed, exposing cladding 231b of first optical fiber 231 and cladding 232b of second optical fiber 232. Due to the exposure of cladding 231b of first optical fiber 231 and cladding 232b of second optical fiber, light propagating from core 231c of first optical fiber 231 into core 232c of second optical fiber 232 that is scattered at fiber splice 235 can exit cladding 232b of second optical fiber 232 and enter third optical fiber 233, which is placed adjacent fiber splice 235. In conventional systems in which coatings are present in the vicinity of fiber splice 235, this scattered light would typically be absorbed by the coatings or reflected back into the cladding. However, in the embodiment illustrated in FIG. 2G, the light scattered from the spice can propagate toward third optical fiber 233 since the coatings have been removed in the vicinity of the fiber splice. In some embodiments, a coating spanning the gap between coatings 231a and 232a is reapplied after the first optical fiber 231 and the second optical fiber 232 are spliced together. In this case, a portion of the light scattered at fiber splice 235 can still be scattered out of the fiber and propagate towards third optical fiber 233. By placing third optical fiber 233 in the field of the scattered light, a portion of this scattered light can be captured by third optical fiber 233 as illustrated by light propagating in core 233c of third optical fiber 233. In the embodiment illustrated in FIG. 2G and in a manner similar to first optical fiber 231 and second optical fiber 232, coating 233a of third optical fiber 233 has been removed, exposing cladding 233b of third optical fiber 233. In other embodiments, this removal of the coating is not required. One of ordinary skill in the art would recognize many variations, modifications, and alternatives.

Due to the high power operation of the oscillators described herein, sufficient optical power can be scattered into third optical fiber 233 despite the low level of scattering that is produced at fiber splice 235. As an example, for an oscillator producing a 1 kW laser beam in first optical fiber 231, a 0.001% scattering at fiber splice 235 will result in 10 mW of scattered light. If the efficiency with which third optical fiber 233 captures the scattered light is 0.001%, then 100 nW will be captured by the third optical fiber 233. Since photodiodes can have sensitivities in the range of 1 nW, sufficient optical power is available to implement the control systems described herein. One of ordinary skill in the art would recognize many variations, modifications, and alternatives.

Although not illustrated in FIG. 2G, some embodiments of the present invention can utilize an enclosure to provide a controlled environment for fiber splice 235, third optical fiber 233, and free space propagation of the scattered light to third optical fiber 233. Moreover, various packaging approaches can be utilized to provide stability for first optical fiber 231, second optical fiber 232, and third optical fiber 233, including the distance between fiber splice 235 and the input face of third optical fiber 233, as well as the orientation of third optical fiber 233 with respect to fiber splice 235.

Embodiments of the present invention provide a number of benefits in comparison with conventional techniques. As an example, embodiments of the present invention can retain the laser's beam quality into fiber link 205 in comparison with conventional taps, which may degrade the laser's beam quality due to the use of fused fiber and the use of large-mode-area (LMA) fiber that notionally supports several modes.

Figure 2H:
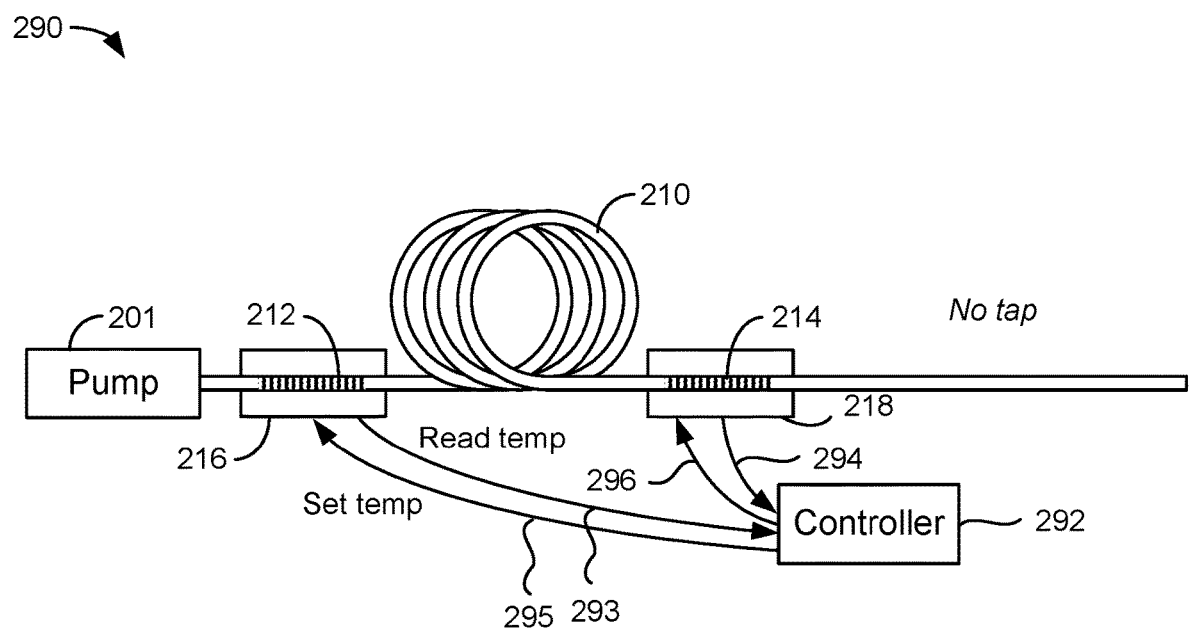
FIG. 2H is a simplified schematic diagram of an oscillator with an alternative control system according to an embodiment of the present invention.

FIG. 2H is a simplified schematic diagram of an oscillator with an alternative control system according to an embodiment of the present invention. For the system illustrated in FIG. 2H, an initialization process can be utilized to define the operating characteristics of cavity mirror 212 and output coupler 214 and temperature measurements can be utilized by the control algorithm. The operation of oscillator 290 includes an initialization process followed by an operation process. During the initialization process, a system operator sets the laser wavelength output by oscillator 290 and implements tuning of the operating characteristics of cavity mirror 212 and output coupler 214 via control of the thermal and mechanical properties of thermo-mechanical housing 216 or thermo-mechanical housing 218, respectively. Generally, this setting of the laser wavelength output is performed during real-time operation of oscillator 290, including during high power operation.

After the initialization process and during operation of oscillator 290, controller 292 receives temperature measurements for cavity mirror 212 and output coupler 214 via temperature sensor cables 293 and 294, respectively. Using the temperatures of both cavity mirror 212 and output coupler 214, controller 292 is able to adjust and maintain the temperatures of both cavity mirror 212 and output coupler 214 at their initialization values using control cables 295 and 296, respectively.

Embodiments of the present invention provide a number of benefits in comparison with conventional techniques. As an example, embodiments of the present invention reduce the control system complexity and retain beam quality since no optical tap is utilized in the embodiment illustrated in FIG. 2H.

FIG. 3A is a plot illustrating reflection spectra for cavity mirrors in a conventional fiber laser. The reflection spectra illustrated in FIG. 3A are shown for an "ideal" case in which it is assumed that no manufacturing errors are present and no temperature variations are experienced. In FIG. 3A, reflection spectrum 310 is associated with cavity mirror 212 shown in FIG. 2A and reflection spectrum 312 is associated with output coupler 214 shown in FIG. 2A. The lasing bandwidth, which is a function of the amplitude of the reflection spectra, is approximately 200 GHz in this example, which assumes no manufacturing errors and no temperature variation. In this example, the fiber Bragg grating (FBG) used as the cavity mirror and the FBG used as the output coupler will have bandwidths on the order of 0.75 nm, which is consistent with the lasing bandwidth of approximately 200 GHz shown in FIG. 3A.

FIG. 3B is a plot illustrating reflection spectra for cavity mirrors with fabrication errors in a conventional laser. When typical fabrication errors of ±0.02 nm in the periodicity of the FBG used as the cavity mirror or the FBG used as the output coupler are introduced, the reflection spectrum 320 for the cavity mirror and the reflection spectrum 322 for the output coupler are shifted in central frequency related to on another, resulting in a reduced lasing bandwidth on the order of 150 GHz. Thus, small variations in manufacturing tolerances can impact the lasing bandwidth.

FIG. 3C is a plot illustrating reflection spectra for cavity mirrors with temperature variation in a conventional laser. When the temperature of the FBG used as the cavity mirror or the FBG used as the output coupler is varied, for example, by 3° C. as illustrated in FIG. 3C, the reflection spectrum 330 for the cavity mirror and the reflection spectrum 332 for the output coupler are shifted in central frequency relative to one another, resulting in a reduced lasing bandwidth on the order of 150 GHz. Thus, in addition to variations in manufacturing tolerances, modification of the operating temperature of the oscillator can impact the lasing bandwidth. The inventors have determined that (a) environmental temperatures may change by +/−5° C. during normal operation and (b) the uneven pumping in a fiber laser can produce thermal differences between the two FBGs on the order of tens of degrees Centigrade even in a uniform environmental temperature condition.

FIG. 3D is a plot illustrating reflection spectra for cavity mirrors in an oscillator according to an embodiment of the present invention. The reflection spectra illustrated in FIG. 3D are shown for typical laser oscillators utilized in the embodiments described herein, which typically have optical bandwidths equal to or less than 20 GHz. The reflection spectra illustrated in FIG. 3D are for an "ideal" case, similar to that shown for a conventional laser in FIG. 3A, in which it is assumed that no manufacturing errors are present and no temperature variations are experienced. In FIG. 3D, reflection spectrum 340 is associated with cavity mirror 212 shown in FIG. 2A and reflection spectrum 342 is associated with output coupler 214 shown in FIG. 2A. The lasing bandwidth, which is a function of the amplitude of the reflection spectra, is approximately 10 GHz in this example, which assumes no manufacturing errors and no temperature variation. In this example, the fiber Bragg grating (FBG) used as the cavity mirror and the FBG used as the output coupler will have bandwidths on the order of 0.0374 nm, which is consistent with the lasing bandwidth of approximately 10 GHz shown in FIG. 3D.

Figure 3E:
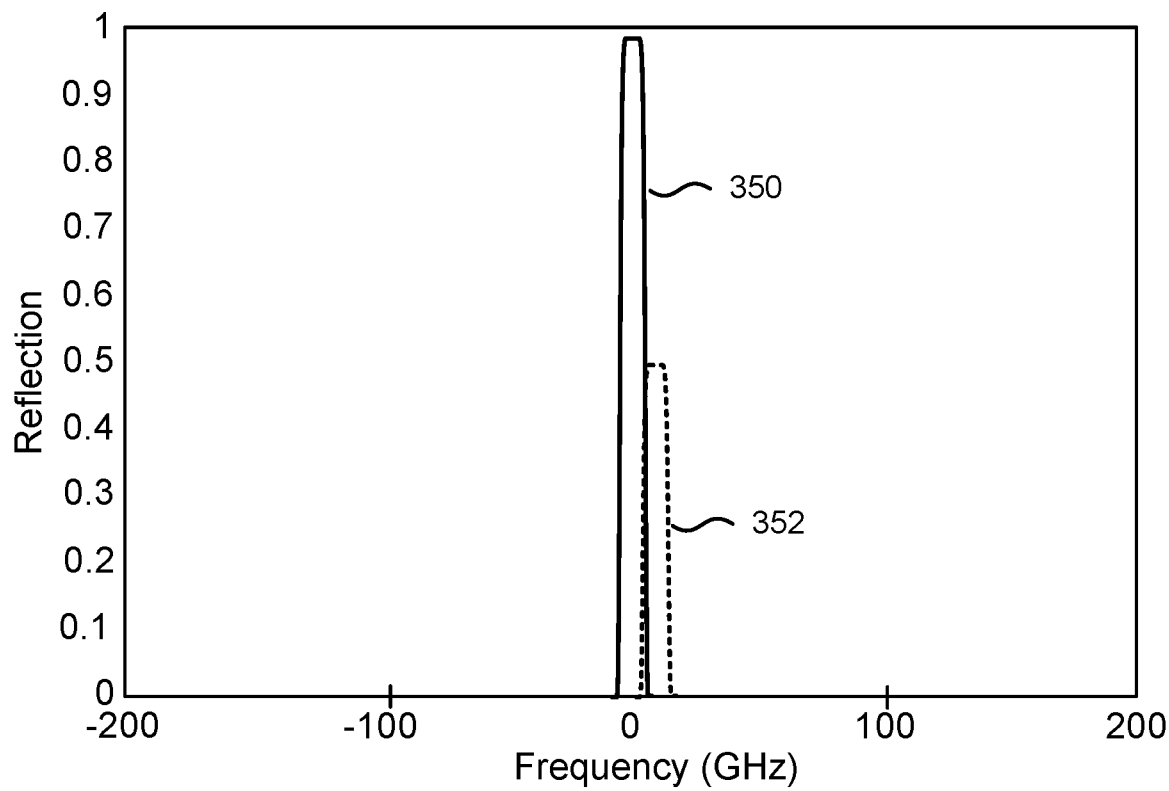
FIG. 3E is a plot illustrating reflection spectra for cavity mirrors with fabrication errors in an oscillator according to an embodiment of the present invention.

FIG. 3E is a plot illustrating reflection spectra for cavity mirrors with fabrication errors in an oscillator according to an embodiment of the present invention. When a fabrication error of ±0.02 nm in the periodicity of the FBG used as the output coupler is introduced, the reflection spectrum 352 for the output coupler is shifted by 10 GHz with respect to the reflection spectrum 350 of the cavity mirror, resulting in a reduced spectral overlap (e.g., no spectral overlap) between reflection spectrum 350 of the cavity mirror and the reflection spectrum 352 of the output coupler, and thereby preventing lasing given this manufacturing error.

Figure 3F:
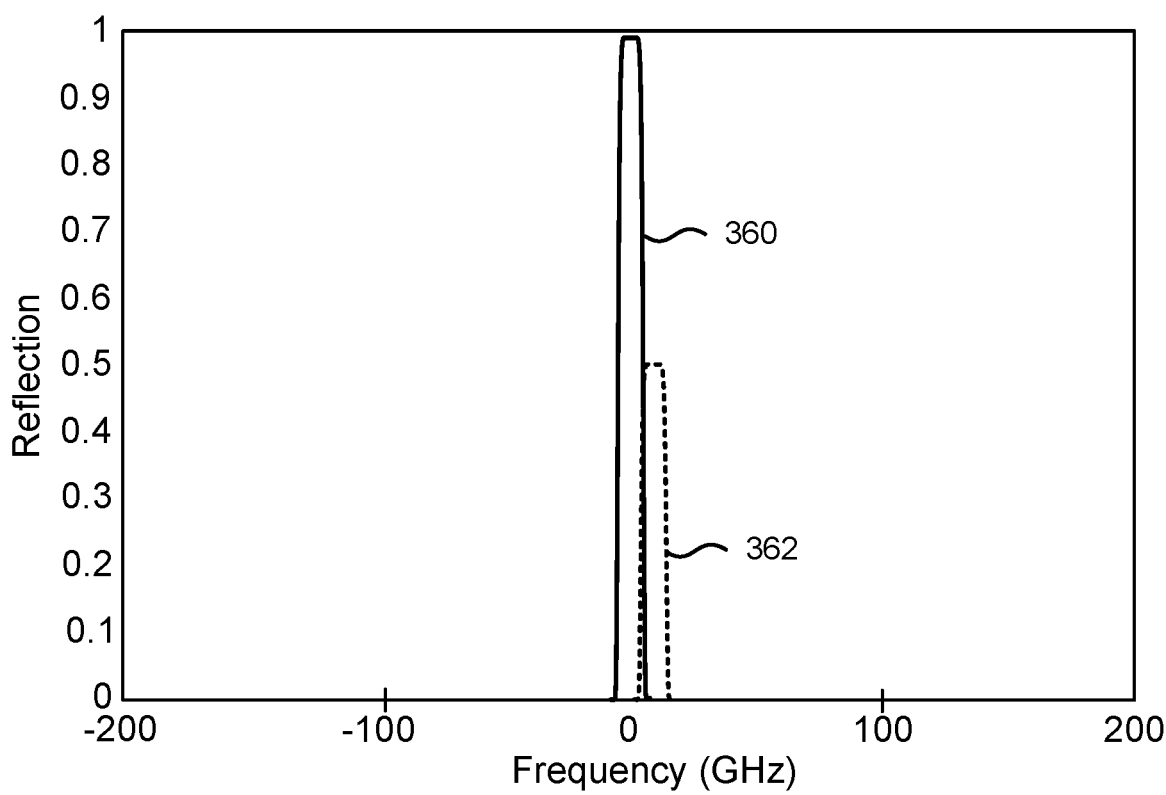
FIG. 3F is a plot illustrating reflection spectra for cavity mirrors with temperature variation in an oscillator according to an embodiment of the present invention.

FIG. 3F is a plot illustrating reflection spectra for cavity mirrors with temperature variation in an oscillator according to an embodiment of the present invention. When the temperature of the FBG used as the output coupler is varied with respect to the temperature of the FBG used for the cavity mirror, for example, by 3° C. as illustrated in FIG. 3F, the reflection spectrum 362 for the output coupler is shifted by 10 GHz with respect to the reflection spectrum 360 for the cavity mirror, resulting in a reduced spectral overlap (e.g., no spectral overlap) between reflection spectrum 360 of the cavity mirror and the reflection spectrum 362 of the output coupler, and thereby preventing lasing given this temperature difference.

Accordingly, embodiments of the present invention utilize precise control over the temperature and physical properties of the cavity mirror 212 and the output coupler 214 to enable the laser oscillator, despite the narrow spectral bandwidth, for example, on the order of 10 GHz, to achieve lasing.

In contrast with conventional lasers as illustrated in FIGS. 3A-3C, which are characterized by large bandwidths (e.g., on the order of 150-200 GHz, embodiments of the present invention utilize laser oscillators that are characterized by narrow bandwidths on the order of tens of gigahertz (e.g., 10 GHz). As a result, if an attempt was made to combine the output from conventional lasers in a spectral beam combiner, the output from each of the individual lasers would overlap spectrally, resulting in a combined beam with a non-uniform intensity profile. According to embodiments of the present invention, utilizing narrow bandwidth laser oscillators, the adjacent laser oscillators can be combined with each laser covering a bandwidth adjacent to the other adjacent lasers, thereby providing a uniform intensity profile for the combined beam since the angle of each laser beam exiting the spectral beam combiner will cover a range of angles, with adjacent laser beams covering adjacent, non-overlapping ranges.

Although FIGS. 3D-3F illustrate a design in which two narrow band gratings are utilized for the cavity mirror and the output coupler, embodiments of the present invention are not limited to this implementation. In other embodiments, the cavity mirror and output coupler have different spectral properties while still providing a narrow combined reflection profile.

In one alternative embodiment for the FBG architecture, one narrowband FBG and one broadband FBG are utilized. As an example, the output coupler can be characterized by a bandwidth of less than or equal to 20 GHz and the cavity mirror can be characterized by a bandwidth between 20 GHz and 200 GHz. In this embodiment, the bandwidth of the output coupler will define the gain bandwidth and only the narrowband FBG will be finely tuned and stabilized. The broadband FBG used as the cavity mirror will typically be stabilized, but will not need to be as well controlled. Thus, this embodiment will reduce the control requirements while accomplishing the goal of a narrow and controlled bandwidth. In other embodiments, the mirror bandwidths are reversed, with the cavity mirror being characterized by a bandwidth of less than or equal to 20 GHz and the output coupler being characterized by a bandwidth between 20 GHz and 200 GHz.

In yet another alternative embodiment, two broadband gratings that have detuned center frequencies and narrow overlap between their corresponding bandwidth are utilized. In this embodiment, narrowband FBGs are replaced with broadband FBGs that are controlled to provide narrow overlap. As an example, the cavity mirror can be characterized by a first bandwidth centered at a first center frequency and the output coupler can be characterized by a second bandwidth centered at a second center frequency, with the overlap between the first bandwidth and the second bandwidth being less than 20 GHz. Thus, in this embodiment, one broadband FBG is detuned with respect to the other broadband FBG and the center frequency of both FBGs is controlled to provide a narrow overlap that defines the gain bandwidth. In other embodiments, the mirror bandwidths are reversed, with the output coupler being characterized by a first bandwidth centered at a first center frequency and the cavity mirror being characterized by a second bandwidth centered at a second center frequency with the overlap between the first bandwidth and the second bandwidth being less than 20 GHz.

Figure 4A:
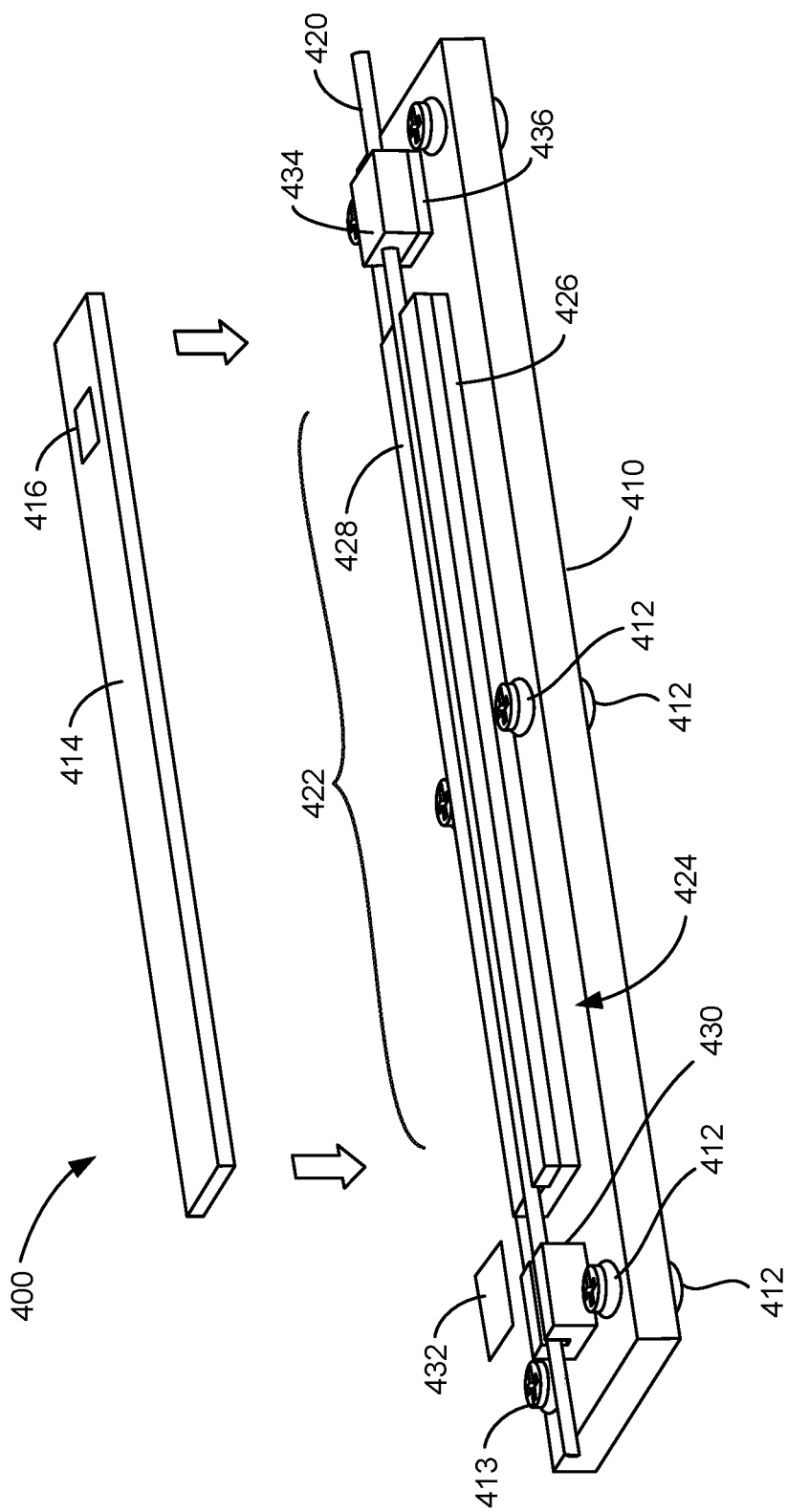
FIG. 4A is a simplified schematic diagram illustrating a thermo-mechanical housing according to an embodiment of the present invention.

FIG. 4A is a simplified schematic diagram illustrating a thermo-mechanical housing 400 according to an embodiment of the present invention. The illustrated thermo-mechanical housing can be utilized as thermo-mechanical housing 216 or thermo-mechanical housing 218 as illustrated in FIG. 2A and provides a precision, temperature-controlled platform for control and operation of a fiber Bragg grating. It should be noted that although thermo-mechanical housing 400 can be utilized in conjunction with the spectral beam combiner described herein, the thermo-mechanical housing is not limited to these applications and can be utilized in other optical applications. As an example, narrow-band fiber gratings deployed in thermo-mechanical housing 400 can be utilized in intra-cavity or extra-cavity filtering in low-noise laser systems. The use of the thermo-mechanical housing enables fiber gratings with high quality factors, for example, Q>2,000,000 (i.e., bandwidth<100 MHz) to be implemented, representing an order of magnitude higher quality factor than passive laser cavities typically found in semiconductor lasers. Moreover, when integrated into an optical communication system, high-Q, high-reflectivity, and low-loss fiber gratings deployed in a thermo-mechanical housing can enable suppression of laser noise in the mid-high offset frequency band (offset frequency>100 MHz), where the excess noise in this band significantly affects the signal to noise ratio of communication channels and the sensitivity of optical sensing systems due to compromise between additive noise and phase noise filtering.

As illustrated in FIG. 4A, embodiments of the present invention provide a mechanical design for a thermo-mechanical housing for the fiber grating that provides mechanical support for the fiber while reducing or minimizing the transfer of mechanical perturbations in the environment to the fiber and specifically, to the grating section of the fiber. As described below, a novel architecture including a single region of rigid contact between elements of the thermo-mechanical housing and the fiber, vibration isolation between the housing and the fiber, and a thermal control section adjacent to and thermally coupled to the FBG enables the implementation of a feedback control system using optical input and output power measurements as illustrated in FIG. 2A.

Referring to FIG. 4A, thermo-mechanical housing 400 includes mechanical mount 410, which can be fabricated using materials with high rigidity. As an example, mechanical mount 410 can be fabricated from invar or other suitable materials and can have dimensions on the order of 20 mm in length, 10 mm in width, and 10 mm in thickness. A plurality of vias passing through mechanical mount 410 are used to enable shock absorbing members 412 to pass through mechanical mount 410. Shock absorbing members 412 can be fabricated from elastic materials with high elasticity, including silicone, rubber, and the like.

Although not illustrated in FIG. 4A for purposes of clarity, mechanical mount 410 is joined to a housing (not shown) using fasteners 413, which are illustrated as Phillips head screws in this embodiment. Shock absorbing members 412 are mounted between mechanical mount 410 and the housing (not shown) and fasteners 413 in order to isolate mechanical mount 410 from the housing (not shown). In other embodiments, other mounting techniques are utilized to mechanically isolate mechanical mount 410 from surrounding structures. Although shock absorbing members 412 are illustrated as ring-shaped elastic O-rings, this is not required by the present invention and other implementations, including an elastic gasket having a shape corresponding to that of mechanical mount 410 can be positioned between mechanical mount 410 and the housing (not shown) in order to reduce vibration of fiber 420, particularly grating section 422, which can be referred to as the FBG, for example, at acoustic frequencies. Thus, thermo-mechanical housing 400, including the housing (not shown), can be utilized as thermo-mechanical housing 216 or thermo-mechanical housing 218 as illustrated in FIG. 2A. One of ordinary skill in the art would recognize many variations, modifications, and alternatives.

In order to support grating section 422 of fiber 420, fiber suspension unit 424 includes heating element 426 mounted on mechanical mount 410 and base plate 428 mounted on heating element 426. In some embodiments, heating element 426 includes a thermoelectric material that can be heated or cooled in response to current flow. In other embodiments, a resistive element is included in heating element 426 to enable the temperature of the heating element to be increased and decreased in response to current flow. Although thermoelectric and resistive elements are described herein, embodiments of the present invention are not limited to these particular implementations of a heating element and other devices can be used to provide thermal control for heating element 426.

In embodiments in which heating element 426 is implemented as a thermoelectric element, it can have a thickness on the order of ~2-3 mm can be mounted directly to mechanical mount 410 or positioned between a shock absorbing pad (now shown) and base plate 428. In this embodiment, base plate 428 can be positioned on the cold side and mechanical mount 410 can be positioned on the hot side of the thermoelectric element. A membrane heater can also be used, for example, with a thermal insulator (e.g., a Teflon plate) positioned between the membrane heater and mechanical mount 410 to reduce heat flow to mechanical mount 410. Thus, in this embodiment, the membrane heater in combination with the thermal insulator can result in a combined thickness>5 mm. As will be evident to one of skill in the art, the response time associated with thermal control roughly scales with (total thermal capacity of the holder)/(maximum thermal output power of thermal element−heat loss to external elements), so reductions in size of the various elements and better thermal insulation around the elements will increase responsivity.

The combination of mechanic mount 410 being supported by shock absorbing members 412, fiber guide 430 and fibers suspension unit 424 suspending fiber 420 in a low friction and high thermal conductivity material, and fiber anchor 434 mounted to mechanical mount 410 using shock absorbent pad 436 enables the isolation of fiber 420 from both external vibrations and mechanical stress via the damped suspension of fiber 420, particularly grating section 422, by these elements utilizing the thermal grease.

Base plate 428 is mounted to heating element 426 and is thermally coupled to heating element 426 in order to inject or extract thermal energy into our out of grating section 422 of fiber 420. Base plate 428 includes a groove running along the length of the base plate. The groove can be referred to as a longitudinal groove. In the illustrated embodiment, the groove is laterally centered on base plate 428 and has a depth approximately equal to the thickness of base plate 428. Grating section 422 of fiber 420 is suspended in a thermal compound (not shown). The thermal compound, for example, silicone or graphite-infused paste, provides a high level of thermal conductivity between grating section 422 of fiber 420, base plate 428, and heating element 426. A variety of thermal compounds, also referred to as thermal grease, can be utilized to provide low friction, high thermal conductivity support for grating section 422 of fiber 420. Thus, thermally-induced stress that would arise in grating section 422 of fiber 420 if the temperature of grating section 422 varied without an accompanying variation in length can be reduced or prevented.

In some embodiments, grating section 422 of fiber 420, as well as other sections of fiber 420, can be encased in a low friction sheath, for example, a graphite wrap, that surrounds and contacts the periphery of the fiber, thereby allowing for motion of the fiber longitudinally with respect to the low friction sheath. Such a graphite-wrapped fiber surface will be characterized by reduced friction with respect to the side walls of the groove of base plate 428. In addition to a reduction in friction, enabling the fiber to translate longitudinally, the low friction sheath can be characterized by high thermal conductivity, improving the thermal uniformity of the fiber and the thermal compound along grating section 422. In embodiments using a graphite wrap, since graphite sheets possess high thermal conductivity ($>>100$ W/(m-K)) parallel to the surface of the graphite sheet, i.e., along the longitudinal axis of the fiber, the temperature of the fiber, particularly, the grating section, can be maintained at a uniform temperature, thereby preventing pass-band broadening. As will be evident to one of skill in the art, if the grating section were characterized by a non-uniform temperature as a function of length, the grating section will be chirped as either the index of refraction and/or the grating spacing will vary with length. This chirp will result in broadening of the pass-band as the different sections of the fiber at different temperatures are characterized by different reflectivity profiles. In addition to graphite wraps, other approaches to increase longitudinal heat transfer, including embedding heat transfer filaments in the thermal compound, are included within the scope of the present invention and are applicable as appropriate. Thus, utilizing embodiments of the present invention, thermal control via heating element 426 and a thermal sensor 416, for example, a thermistor, embedded in cover plate 414, which are elements of fiber suspension unit 424, enables control of the center frequency of the FBG and uniform temperature as a function of length of the FBG reduces pass-band broadening.

Fiber guide 430 supports fiber 420, but allows fiber 420 to translate longitudinally in response to temperature variation and thermal expansion or contraction of the fiber in the longitudinal direction. As discussed in relation to base plate 428, fiber guide 430 includes a groove running along the length of the fiber guide and fiber 420 is suspended in a lubricant compound (not shown) filling the groove. In some embodiments, to distinguish from the groove present in base plate 428, the groove in fiber guide 430 is referred to as a longitudinal channel. The lubricant compound, for example, silicone or graphite-infused paste, in conjunction with the groove in fiber guide 430 enables fiber 420 to be supported while still enabling translation along the longitudinal direction. In some implementations, the portion of fiber 420 supported by fiber guide 430 is encased in a low friction sheath as discussed above. Thus, as the temperature of the fiber varies, mechanically-induced stress that would arise if fiber 420 were not able to expand or contract in length, can be reduced or prevented. As illustrated in FIG. 4A, a cap 432 is attached, for example, bonded, bolted, attached with a screw attachment, or otherwise affixed, to fiber guide 430 to enclose the corresponding portion of fiber 420 and the lubricant compound in the groove in fiber guide 430. Accordingly, fiber 420 is supported in the lateral directions while enabling a degree of longitudinal motion resulting from thermal changes.

Fiber anchor 434 is positioned at the end of mechanical mount 410 opposite fiber guide 430, and supports fiber 420. Fiber 420 is anchored at a substantially fixed longitudinal position using fiber anchor 434. As an example, fiber suspension unit 424 can be fabricated using a plastic/metal cube that is divided in half and has a v-groove engraved onto the top surface of the bottom half. The two halves are then bonded together after fiber 420 has been positioned between them. In the illustrated embodiment, fiber anchor 434, which can be fabricated using a rigid material such as metal or a hard plastic, is mounted on shock absorbent pad 436, however, in some embodiments, fiber anchor 434 is fabricated using an elastic material such as rubber that provides both mechanical support and flexibility. In other embodiments, an elastic material is utilized for both fiber anchor 434 and shock absorbent pad 436. In one embodiment, fiber 420 is positioned on shock absorbent pad 436 and fiber anchor 434 is pressed down to hold fiber 420 between shock absorbent pad 436 and fiber anchor 434. In other embodiments, a bonding materials such as epoxy is used to join the fiber to these elements. Thus, fiber 420 is mechanically supported at a substantially single longitudinal position by fiber anchor 434 in a substantially rigid manner while still providing some mechanical isolation with respect to mechanical mount 410.

In another embodiment, fiber anchor 434 is attached to mechanical mount 410 using fasteners (e.g., screws) that pass through shock absorbent pad 436, preloading shock absorbent pad 436. In another embodiment, fiber 420 can be sandwiched between shock absorbent pads, for example, with one shock absorbent pad positioned on top of the fiber and the other shock absorbent pad positioned below the fiber. In this embodiment, a clamp, for example, a bent metal clamp can be used to press the shock absorbent pads against the metal support (the gray pad in this case).

By anchoring fiber 420 at a single longitudinal region that is spatially separated from grating section 422, grating section 422 is free to expand and contract longitudinally in response to thermal changes. This structure differs from conventional approaches in which the grating section is anchored at both ends or along portions or all of the length of the grating section. If, for example, the grating section were anchored at both ends and the temperature of the thermo-mechanical housing increased, the elements of the thermo-mechanical housing including mechanical mount 410 would expand, stretching the fiber, thereby increasing the grating spacing and changing the reflection profile of the grating.

Cover plate 414 is mounted to base plate 428 to enclose grating section 422 fiber 420 in the groove formed in base plate 428. In some embodiments, a temperature sensor, for example, a thermistor, is embedded in cover plate 414 in order to provide data related to the temperature of grating section 422 of fiber 420. In contrast with approaches that would measure the temperature of elements more remote from grating section 422, for example, the temperature of mechanical mount 410, the close proximity between grating section 422 of fiber 420 and the temperature sensor embedded in cover plate 414 as well as the thermal conduction between these elements enables the temperature measured at the temperature sensor to closely match the actual temperature of grating section 422 of fiber 420. In other embodiments, the temperature sensor is attached to cover plate 414, embedded in or attached to base plate 428, or the like.

Figure 4B:
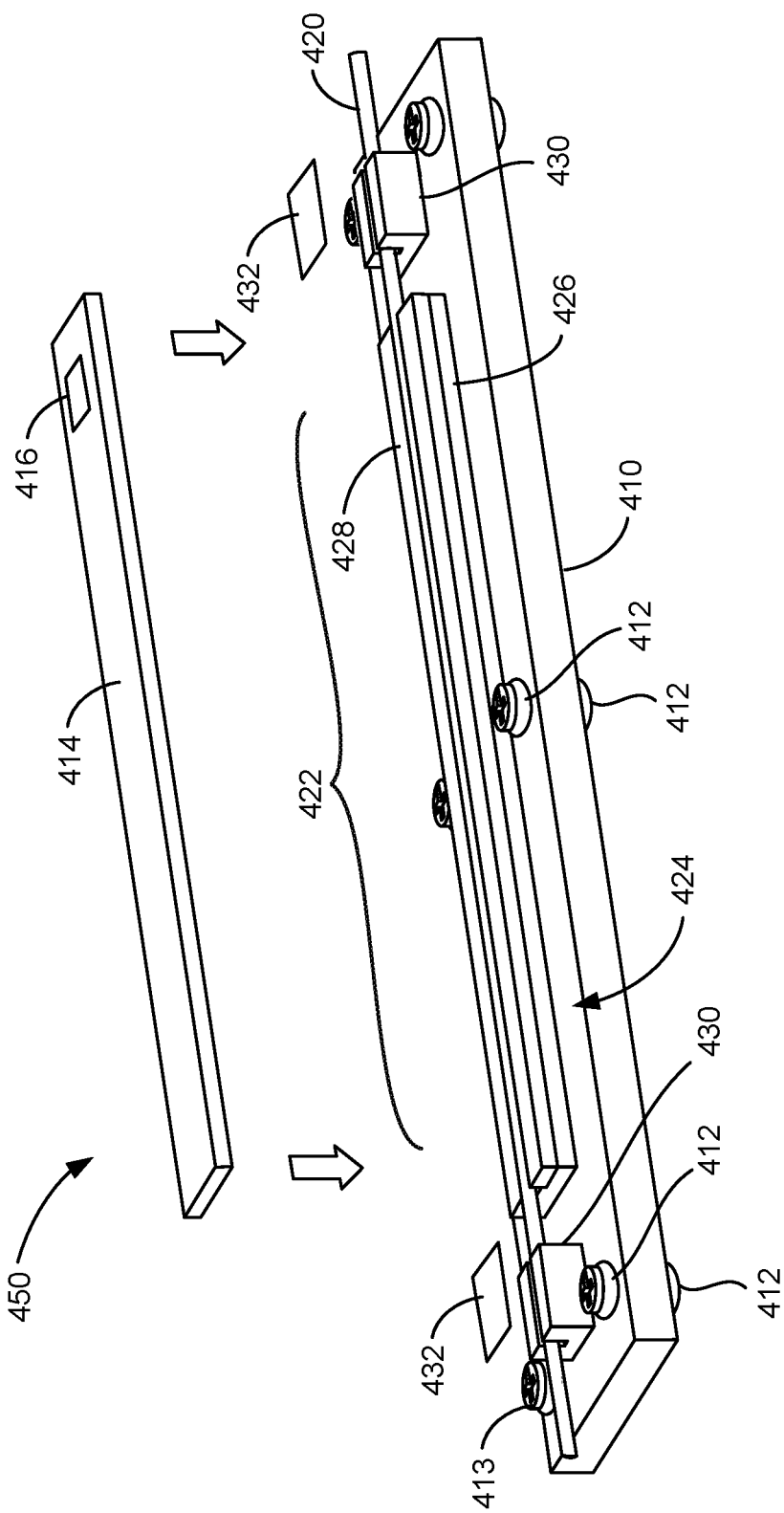
FIG. 4B is a simplified schematic diagram illustrating a thermo-mechanical housing according to an alternative embodiment of the present invention.

FIG. 4B is a simplified schematic diagram illustrating a thermo-mechanical housing according to an alternative embodiment of the present invention. The thermo-mechanical housing illustrated in FIG. 4B shares common components with the thermo-mechanical housing illustrated in FIG. 4A and the description provided in relation to FIG. 4A is application to FIG. 4B as appropriate.

Referring to FIG. 4B, thermo-mechanical housing 450 utilizes components found in thermo-mechanical housing 400, but replaces fiber anchor 434 and shock absorbent pad 436 with fiber guide 430 and cap 432. This, in this embodiment, rather than fiber 420 being anchored at one end, both ends of the fiber are free to translate longitudinally in response to temperature variation and thermal expansion or contraction of the fiber in the longitudinal direction. In this embodiment, cap 432 can be attached to fiber guide 430 in manners other than bonding, including a screw attachment.

In the embodiment illustrated in FIG. 4B, although fiber 420 is free to move in the longitudinal direction, the fiber will remain in the longitudinal groove in base plate 428 for several reasons. For example, fiber position in the base plate will occur due to contact with the thermal material (e.g., thermal paste) placed in the longitudinal groove along with the fiber and/or in the groove running along the length of the fiber guide. Additionally, contact between the fiber and the lubricant compound (not shown) filling the groove will aid in maintaining the fiber in the base plate.

Figure 4C:
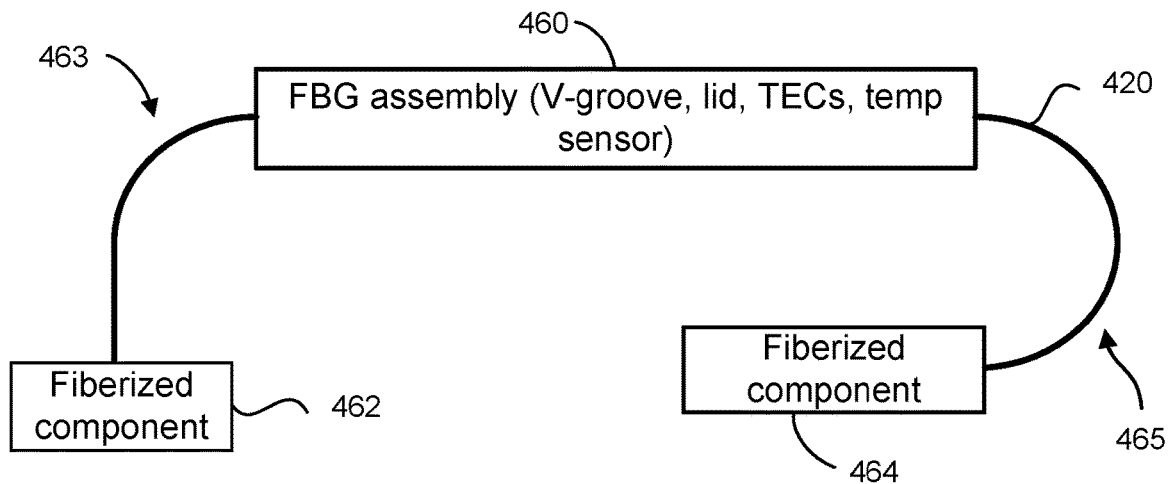
FIG. 4C is a simplified schematic diagram of an FBG assembly incorporated with fiberized components according to an embodiment of the present invention.

FIG. 4C is a simplified schematic diagram of an FBG assembly incorporated with fiberized components according to an embodiment of the present invention. The FBG assembly 460 can be implemented as thermo-mechanical housing 400 illustrated in FIG. 4A or as thermo-mechanical housing 450 illustrated in FIG. 4B. Additionally in some embodiments, only certain components of thermo-mechanical housing 450 are utilized to fabricate FBG assembly 460, for example, elements illustrated in FIG. 4B, including a base plate including a longitudinal groove, a heating element, for example, one or more thermo-electric coolers (TECs), a cover plate with an embedded thermal sensor, other thermal sensors, or the like, but with fiber guide 430 and cap 432 removed at both ends of base plate 428.

Referring to FIG. 4C, fiber 420 extending from thermo-mechanical housing 400/450 is mechanically attached at a first end to a first attachment element, implemented as a fiberized component 462 in this embodiment and at a second end to a second attachment element, implemented as a fiberized component 464 in this embodiment. Fiberized components 462 and 464 assist in maintaining the fiber in the longitudinal groove in the base plate by providing an overall anchor that fixes the portion of the fiber adjacent the fiberized component at a predetermined location. Examples of fiberized components include, but are not limited to, isolators, couplers, filters, taps, and wavelength division multiplexers.

Additionally, bend 463, illustrated as a 90° bend in this example, and bend 465, illustrated as a 180° in this example, provide flexibility along the length of the fiber, operating in a manner similar to a spring, in order to mitigate temperature-induced length changes or vibrations in the fiber. Although 90° and 180° bends are illustrated in FIG. 4C, this is merely exemplary and other bend angles can be utilized by the embodiments described herein in order to secure the fiber in place via the support provided by the fiberized components and the bends in the fiber.

Figure 4D:
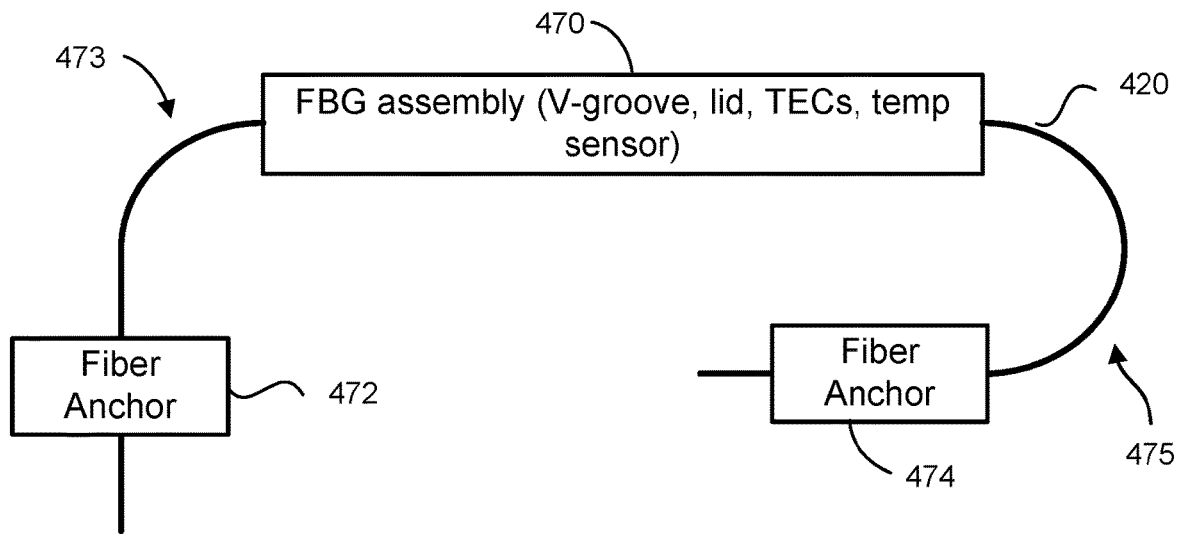
FIG. 4D is a simplified schematic diagram of an FBG assembly incorporated with fixed fiber components according to an embodiment of the present invention.

FIG. 4D is a simplified schematic diagram of an FBG assembly incorporated with fixed fiber components according to an embodiment of the present invention. The FBG assembly 470 can be implemented as thermo-mechanical housing 400 illustrated in FIG. 4A or as thermo-mechanical housing 450 illustrated in FIG. 4B. Additionally in some embodiments, only certain components of thermo-mechanical housing 450 are utilized to fabricate FBG assembly 470, for example, elements illustrated in FIG. 4B, but with fiber guide 430 and cap 432 removed at both ends of base plate 428.

Referring to FIG. 4D, fiber 420 extending from thermo-mechanical housing 400/450 is mechanically attached at a first end to a first attachment element, implemented as a fiber anchor 472 in this embodiment and at a second end to a second attachment element, implemented as a fiber anchor 474 in this embodiment. The fiber anchors can be implemented using fiber anchor 434 illustrated in FIG. 4A. In other embodiments, the fiber anchors can be implemented using suitable adhesives and/or either permanent or temporary bonding materials. Fiber anchors 472 and 474 assist in maintaining the fiber in the longitudinal groove in the base plate by providing an overall anchor that fixes the portion of the fiber adjacent the fiber anchors at a predetermined location.

Additionally, bend 473, illustrated as a 90° bend in this example, and bend 475, illustrated as a 180° in this example, provide flexibility along the length of the fiber, operating in a manner similar to a spring, in order to mitigate temperature-induced length changes or vibrations in the fiber. Although 90° and 180° bends are illustrated in FIG. 4D, this is merely exemplary and other bend angles can be utilized by the embodiments described herein in order to secure the fiber in place via the support provided by the fiber anchors and the bends in the fiber.

Figure 5A:
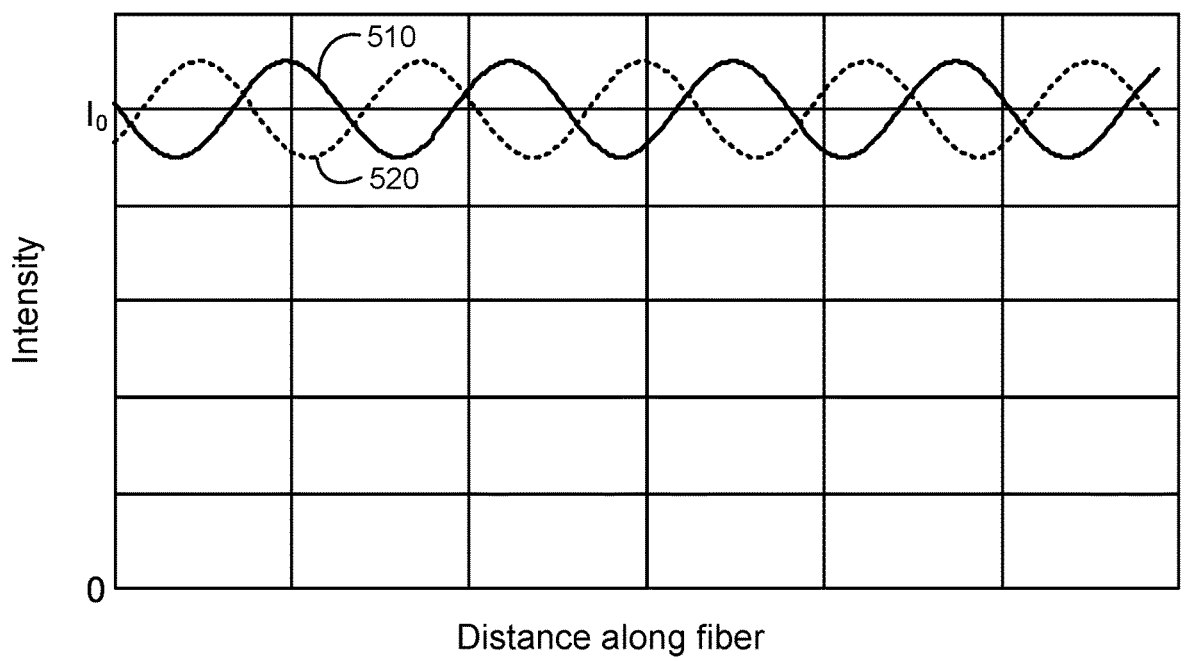
FIG. 5A is a plot illustrating two intensity patterns, each resulting from the beating of two transverse modes, for two different longitudinal modes in an oscillator according to an embodiment of the present invention.

FIG. 5A is a plot illustrating intensity patterns, each resulting from the beating of two transverse modes, for two different longitudinal modes in an oscillator, for example, a fiber laser, according to an embodiment of the present invention. In FIG. 5A, the intensity of light is plotted as a function of the length of the gain medium, for example, the length of the dual-clad fiber. As described herein, the coherent combination of transverse modes creates a periodic intensity pattern that produces thermal mode instability (TMI). TMI has been demonstrated to produce a sudden decrease in beam quality in fiber lasers. As the output power increases, multiple transverse modes (e.g., the $LP_{01}$ mode and the $LP_{11}$ mode) can coherently combine to create an intensity pattern along the length of the fiber as a result of the transverse modes propagating in the fiber at different speeds. This results in a sinusoidal pattern in the optical intensity as a function of length of a first longitudinal mode, which can also be referred to as a Fabry-Perot mode, as illustrated by periodic intensity profile 510 in FIG. 5A. As gain is extracted at high power, the periodic intensity profile 510 produces a variation in gain as a function of length. The saturated gain profile correlates with the periodic intensity profile and the extraction of gain results in a thermal profile along the length of the fiber. The change in refractive index that results from the thermal profile (i.e., $\Delta n/\Delta T$) creates a long period grating that couples power between the transverse modes, specifically from the $LP_{01}$ mode to the $LP_{11}$ mode, thereby resulting in the decrease in beam quality.

For a single longitudinal mode, the intensity as a function of length can be characterized by a modulation depth of 18%, resulting in TMI as the power is increased to high powers.

In a similar manner for the other longitudinal modes, a periodic intensity profile 520 is produced for a second longitudinal mode, resulting in a variation in gain as a function of length accompanied by a thermal profile as a function of length. In an amplifier configuration, the transverse modes typically have a predetermined phase relationship when they are launched into the gain medium (e.g., the fiber). However, in an oscillator, the transverse modes will typically come to threshold separately, resulting in a random phase difference between them. Moreover, the absolute phase of each longitudinal mode in an oscillator will be random, further randomizing the relationship of the variations that occur due to multiple longitudinal modes.

Figure 5B:
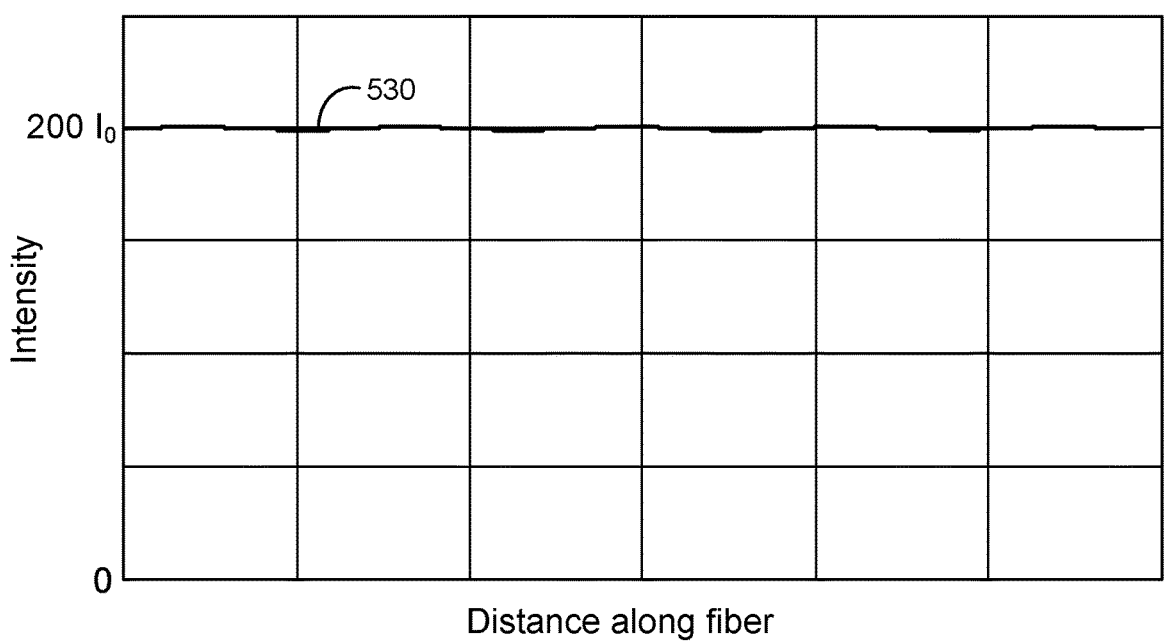
FIG. 5B is a plot illustrating a combined intensity pattern resulting from the beating of two transverse modes for each of 200 longitudinal modes in an oscillator according to an embodiment of the present invention.

FIG. 5B is a plot illustrating a combined intensity pattern resulting from the beating of two transverse modes for each of 200 spectral modes according to an embodiment of the present invention. In FIG. 5B, the intensity of light is plotted as a function of the length of the gain medium, for example, the length of the dual-clad fiber. In order to provide effective spectral beam combination, some embodiments of the present invention limit the bandwidth of each of the oscillators 110/120/130 to 10 GHz. This bandwidth control can be implemented by using a cavity mirror and an output coupler characterized by a reflection bandwidth of ~10 GHz. Given this 10 GHz bandwidth and a longitudinal mode spacing of 50 MHz, each oscillator will generate 200 longitudinal modes. Since each of the 200 longitudinal modes will be randomly shifted in phase with respect to the other longitudinal modes, the intensity pattern created by the transverse modes associated with each of the longitudinal modes will have a random phase relationship. Thus, the intensity profiles associated with each of the longitudinal modes in each independent oscillator will add incoherently, resulting in intensity pattern 530 shown in FIG. 5B. In this example, the modulation depth for intensity pattern 530 is 1.2%, more than an order of magnitude less than that associated with a single longitudinal mode. Given this low modulation depth in the intensity profile, the gain variation and resulting thermal profiles will be characterized by small modulation depths.

Another way to consider the impact of the random phase relationship between longitudinal modes is to consider the gain profile resulting from the interference of the transverse modes in each longitudinal mode. Given that each longitudinal mode creates an intensity pattern characterized by an 18% modulation depth, each longitudinal mode will extract gain non-uniformly, resulting in gain variation and a non-uniform thermal profile. However, since each longitudinal mode has a random phase relationship to the other longitudinal modes, each longitudinal mode can be considered as shifted along the length of the gain medium by a random amount. As a result, the intensity pattern characterizing each longitudinal mode will result in gain variation, but shifted by a random amount along the length. As a result, as the gain is extracted by each longitudinal mode, the random phase relationship will result in a gain profile that is associated with intensity pattern 530, which is characterized by a modulation depth of only 1.2%.

Given this significant decrease in the modulation depth, the onset of TMI will be delayed to significantly higher powers, enabling high power operation without experiencing the sudden decrease in beam quality associated with TMI. In the example illustrated in FIGS. 5A and 5B, the improvement in the TMI threshold is a factor of 14. Since typical TMI thresholds are on the order of 300 W, embodiments of the present invention can utilize individual oscillators operating at power levels on the order of 4 kW without reaching the TMI threshold.

Figure 6A:
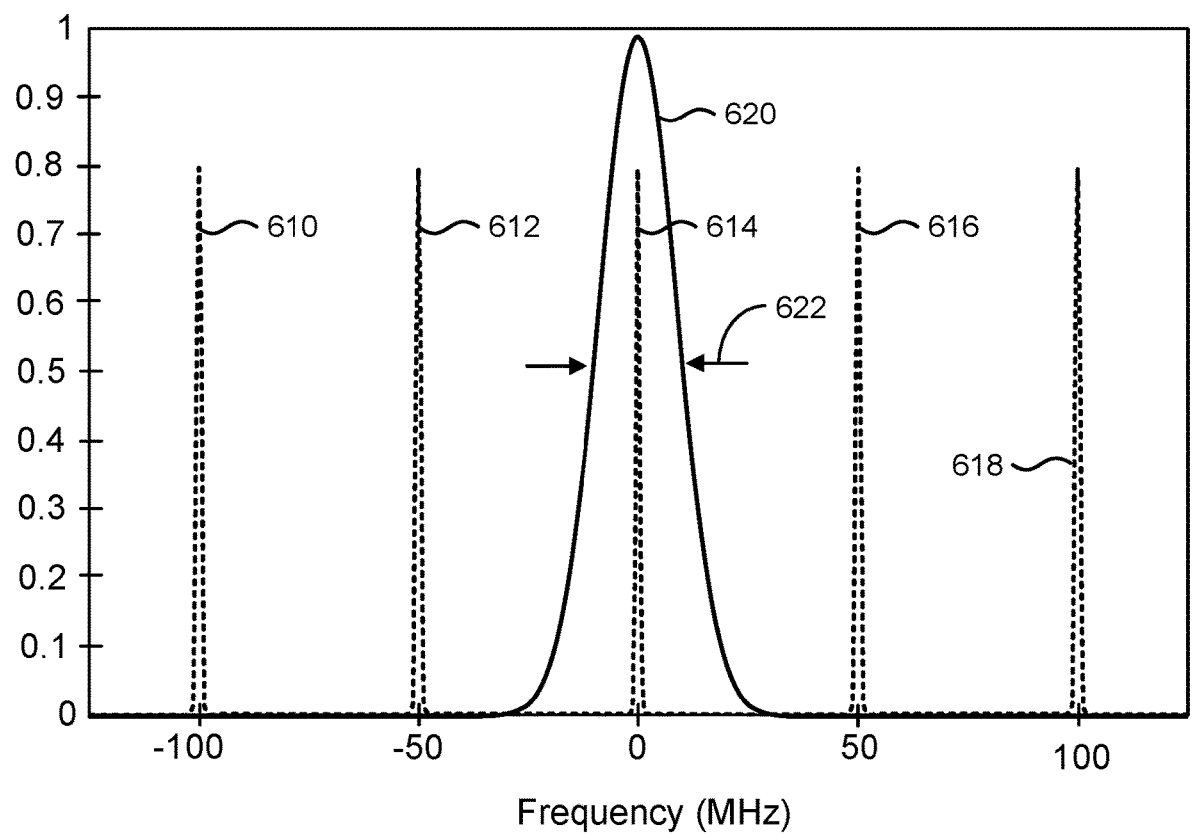
FIG. 6A is a plot illustrating five longitudinal modes and an SBS spectral response in an oscillator according to an embodiment of the present invention.

FIG. 6A is a plot illustrating five longitudinal modes and an SBS spectral response in an oscillator according to an embodiment of the present invention. As illustrated in FIG. 6A, longitudinal modes 610, 612, 614, 616, and 618 are shown with a spectral separation of 50 MHz between each of the longitudinal modes. Of course, embodiments of the present invention are not limited to the use of five longitudinal modes and, as discussed in relation to FIG. 5B, given a FBG reflection profile with a bandwidth of 10 GHz, 200 longitudinal modes can be utilized in some embodiments. Thus, FIG. 6A is merely exemplary. The spectral separation between adjacent longitudinal modes is determined as a function of the length of the laser oscillator, e.g., a fiber laser, with the spectral separation equal to $c/2$ nL, where L is the length of the laser oscillator. For some of the embodiments discussed herein, with a spectral separation of 50 MHz, fiber lengths on the order of 1.5-2 m are utilized, thereby providing both the desired spectral separation between longitudinal modes and sufficient gain to achieve high power operation.

The SBS spectral response is illustrated by curve 620, which illustrates a typical width 622 (i.e., full width at half maximum (FWHM)) of 20 MHz. As will be evident to one of skill in the art, different fibers have different SBS bandwidths and the SBS spectral response illustrated in FIG. 6A is merely exemplary of the SBS bandwidth that is observed in a number of fibers. Accordingly, because the spacing between longitudinal modes is greater than the width of the SBS spectral response, the spectral content outside the width of the SBS spectral response curve will not contribute to SBS at wavelengths within the width of the SBS spectral response curve.

Referring to FIG. 6A, the power in longitudinal mode 614 will reach a predetermined power before an SBS threshold is reached. However, since longitudinal modes 610, 612, 616, and 618 are outside the SBS spectral response curve 620, the power in these longitudinal modes will not contribute to the power related to the SBS threshold for longitudinal mode 614. Accordingly, for the five longitudinal modes that are illustrated in FIG. 6A, each longitudinal mode will have a separate SBS threshold. As a result, a laser oscillator lasing with 200 longitudinal modes, each separated by a spectral separation greater than the SBS spectral response, will be able to reach a power 200 times the SBS threshold for the individual longitudinal modes.

In some embodiments, the total number of longitudinal modes can be increased while still preserving the high SBS threshold. As an example, if the longitudinal mode spacing is decreased, for example, from 50 MHz to 5 MHz, the number of longitudinal modes will increase by a factor of ten.

Figure 6B:
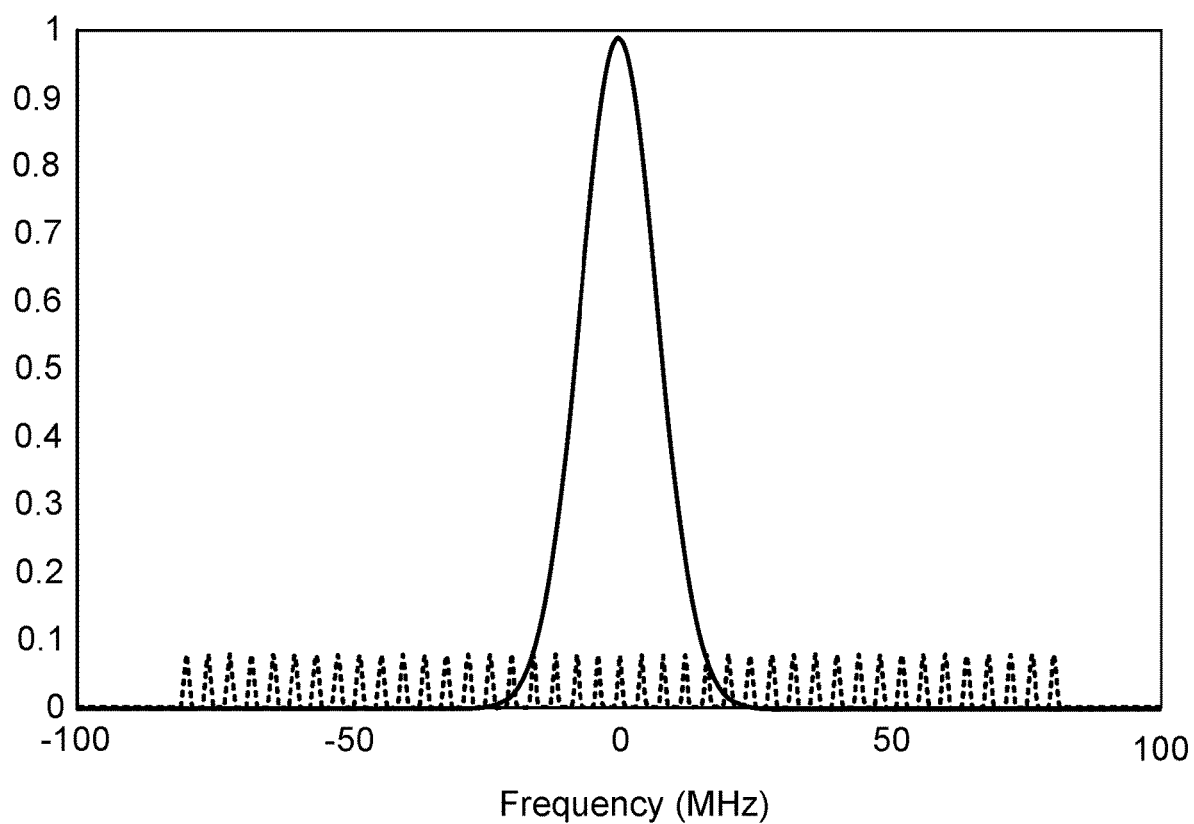
FIG. 6B is a plot illustrating 40 longitudinal modes and an SBS spectral response in an oscillator according to an embodiment of the present invention.

FIG. 6B is a plot illustrating 40 longitudinal modes and an SBS spectral response in an oscillator according to an embodiment of the present invention. Thus, rather than having a single longitudinal mode within the SBS spectral response curve, ten longitudinal modes could be present. However, since each of the longitudinal modes will have ten times less power, the total power associated with this increased number of longitudinal modes will be the same, resulting in the SBS threshold. In the embodiment illustrated in FIG. 6B, approximately seven longitudinal modes are present within the width of the SBS spectral response curve It should be noted that embodiments of the present invention enable the use of fibers of differing lengths, since, in order to increase the SBS threshold, it is not necessary that the spectral separation between adjacent longitudinal modes be exactly 50 MHz. Rather, a range of spectral separations greater than the width of the SBS spectral response can be utilized while still achieving the increase in SBS threshold discussed herein. Accordingly, a range of fibers having differing lengths can be utilized as appropriate to the particular application, including fiber lasers with cavity lengths on the order of 1 m-2 m, 2 m-3 m, 3 m-4 m, 4 m-5 m, 5 m-6 m, 6 m-7 m, 7 m-8 m, 8 m-9 m, 9 m-10 m or the like. One of ordinary skill in the art would recognize many variations, modifications, and alternatives.

Figure 7:
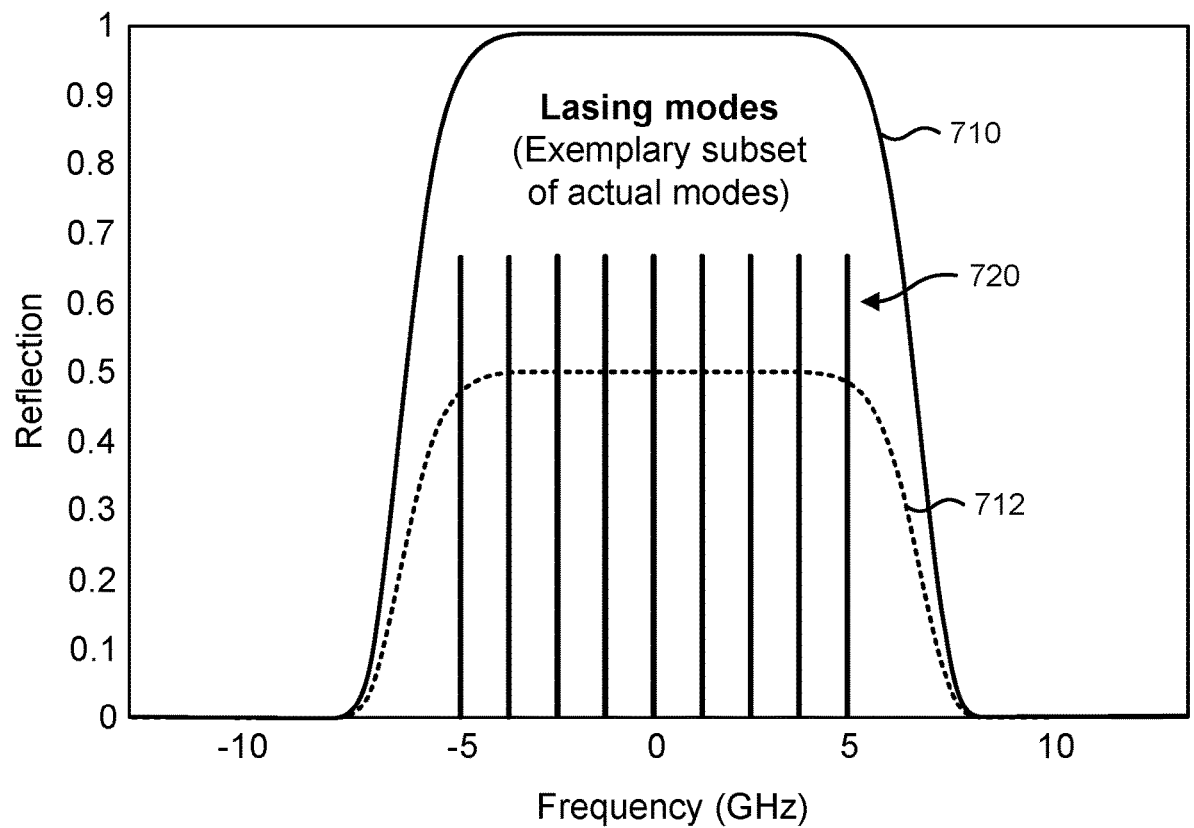
FIG. 7 is a plot illustrating a plurality of longitudinal modes and reflection spectra for an oscillator according to an embodiment of the present invention.

FIG. 7 is a plot illustrating a plurality of longitudinal modes and reflection spectra according to an embodiment of the present invention. In FIG. 7, reflection spectrum 710 associated with the cavity mirror and reflection spectrum 712 associated with the output coupler of each laser oscillator are illustrated. As an example of the longitudinal modes that will be present in the laser output, nine longitudinal modes 720 are shown for purposes of illustration. As discussed herein, given a 10 GHz bandwidth for the reflection spectra and a 50 MHz longitudinal mode spacing between longitudinal modes, ~200 longitudinal modes will be supported and present in the laser output. Thus, the nine longitudinal modes that are illustrated with a longitudinal mode spacing of approximately 1 GHz only represent about 5% of the actual longitudinal modes that will be present in the laser output and this subset of the actual modes is illustrated merely for purposes of clarity.

As discussed in relation to FIG. 5B, the multiple longitudinal modes will prevent TMI since each of the longitudinal modes will have a random phase relationship with the other longitudinal modes produced by the laser oscillator. As a result, they will produce gain variations that are randomly distributed along the length of the oscillator, resulting in a reduced combined gain variation and a reduced thermal profile as a function of length. Additionally, because the longitudinal mode spacing, e.g., 50 MHz, is greater than the SBS spectral response, each longitudinal mode will have a separate SBS threshold, thereby enabling the laser oscillator to achieve a power corresponding to the separate SBS threshold for each longitudinal mode.

Figure 8:
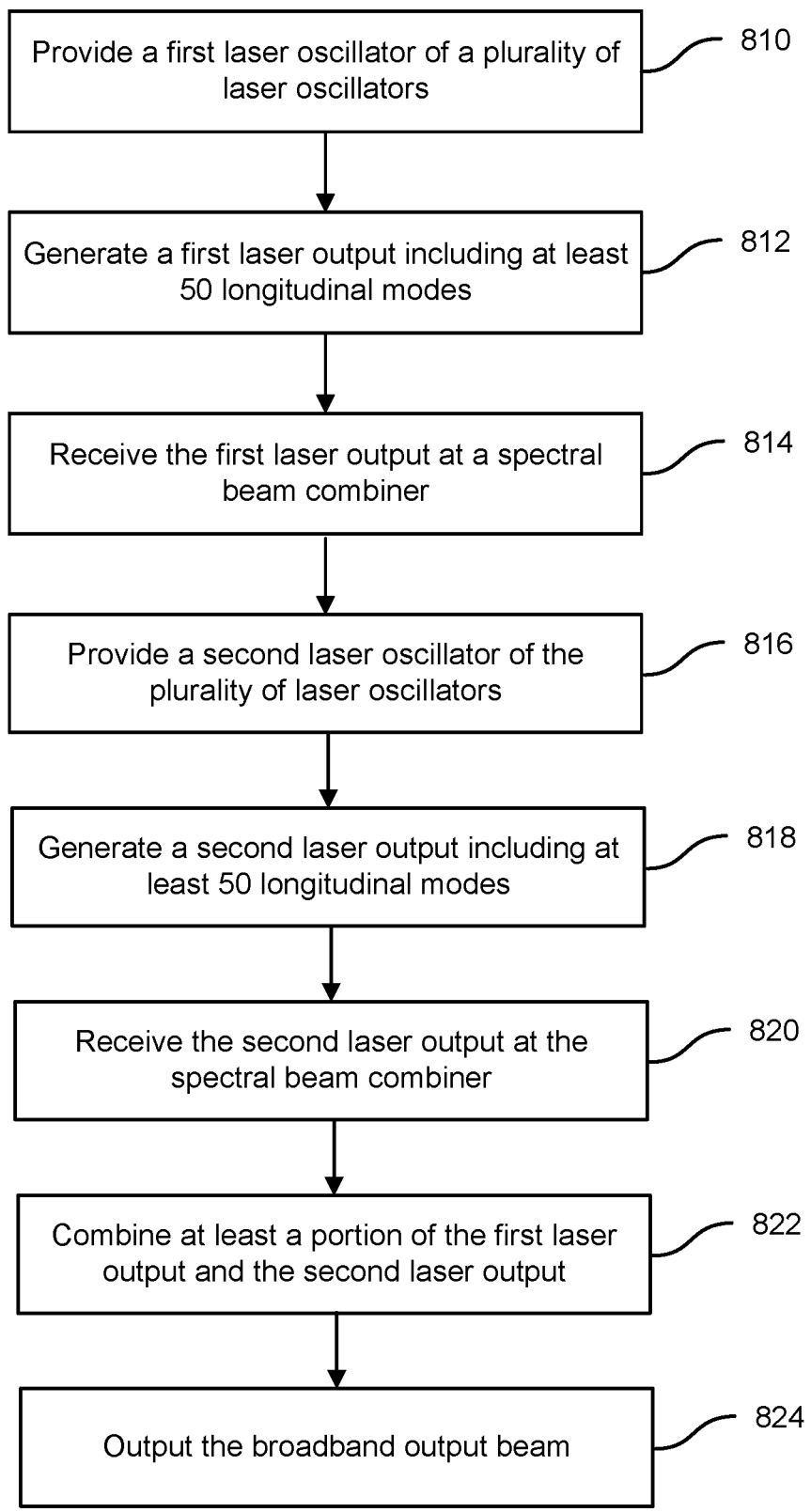
FIG. 8 is a simplified flowchart illustrating a method of operating a multi-wavelength laser system according to an embodiment of the present invention.

FIG. 8 is a simplified flowchart illustrating a method of producing a broadband output beam from a plurality of laser oscillators according to an embodiment of the present invention. The method includes providing a first laser oscillator of the plurality of laser oscillators (810). The first laser oscillator has a first cavity mirror and a first output coupler. The method also includes generating a first laser output including at least 50 longitudinal modes (812) and receiving the first laser output at a spectral beam combiner (814). The method further includes providing a second laser oscillator of the plurality of laser oscillators (816), generating a second laser output including at least 50 longitudinal modes (818), and receiving the second laser output at the spectral beam combiner (820). The second laser oscillator has a second cavity mirror and a second output coupler.

Furthermore, the method includes combining at least a portion of the first laser output and the second laser output (822) and outputting the broadband output beam (824). In some embodiments, no gain is present between the first output coupler and the spectral beam combiner and the second output coupler and the spectral beam combiner. Thus, in contrast with MOPA architectures, the outputs from the individual laser oscillators, without additional gain section(s), is provided as the input to the spectral beam combiner. In an embodiment, in order to reduce SBS, the first laser output can be characterized by a first longitudinal mode spacing on the order of 50 MHz and a first SBS spectral response on the order of 20 MHz. Similarly, the second laser output can be characterized by a second longitudinal mode spacing on the order of 50 MHz and a second SBS spectral response on the order of 20 MHz. I order to reduce TMI, the first laser output can include approximately 200 longitudinal modes and the second laser output can include approximately 200 longitudinal modes.

It should be appreciated that the specific steps illustrated in FIG. 8 provide a particular method of producing a broadband output beam from a plurality of laser oscillators according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A multi-wavelength laser system comprising:
a first fiber laser having a first cavity mirror enclosed in a first thermo-mechanical housing and a first output coupler, wherein:
a first longitudinal mode spacing associated with the first fiber laser is on the order of 50 MHz and a first SBS spectral response associated with the first fiber laser is on the order of 20 MHz; and
the first cavity mirror and the first output coupler are characterized by a first reflection bandwidth on the order of 10 GHz, thereby supporting approximately 200 longitudinal modes;
a first optical coupler connected to the first output coupler;
a second fiber laser having a second cavity mirror enclosed in a second thermo-mechanical housing and a second output coupler, wherein:
a second longitudinal mode spacing associated with the second fiber laser is on the order of 50 MHz and a second SBS spectral response associated with the second fiber laser is on the order of 20 MHz; and
the second cavity mirror and the second output coupler are characterized by a second reflection bandwidth on the order of 10 GHz, thereby supporting 200 longitudinal modes;
a second optical coupler connected to the second output coupler; and
a spectral beam combiner configured to:
receive first output light from the first optical coupler;
receive second output light from the second optical coupler;
combine the first output light and the second output light; and
form a multi-wavelength output beam.

2. The multi-wavelength laser system of claim 1 wherein no gain is present between:
the first output coupler and the spectral beam combiner; and
the second output coupler and the spectral beam combiner.

3. A multi-wavelength laser system comprising:
a first fiber laser having a first cavity mirror enclosed in a first thermo-mechanical housing and a first output coupler, wherein the first fiber laser is characterized by a first lasing bandwidth greater than a first SBS spectral response width;
a first optical coupler configured to receive light from the first output coupler;
a second fiber laser having a second cavity mirror enclosed in a second thermo-mechanical housing and a second output coupler, wherein the second fiber laser is characterized by a second lasing bandwidth greater than a second SBS spectral response width;
a second optical coupler configured to receive light from the second output coupler; and
a spectral beam combiner configured to:
receive first output light from the first optical coupler;
receive second output light from the second optical coupler;
combine the first output light and the second output light; and
form a multi-wavelength output beam.

4. The multi-wavelength laser system of claim 3 wherein the first fiber laser and the second fiber laser are characterized by a bandwidth of less than or equal to 20 GHz.

5. The multi-wavelength laser system of claim 3 wherein the first output coupler is characterized by a bandwidth of less than or equal to 20 GHz and the first cavity mirror is characterized by a bandwidth between 20 GHz and 200 GHz.

6. The multi-wavelength laser system of claim 3 wherein the first cavity mirror is characterized by a bandwidth of less than or equal to 20 GHz and the first output coupler is characterized by a bandwidth between 20 GHz and 200 GHz.

7. The multi-wavelength laser system of claim 3 wherein:
the first cavity mirror is characterized by a first bandwidth centered at a first center frequency; and
the first output coupler is characterized by a second bandwidth centered at a second center frequency, wherein an overlap between the first bandwidth and the second bandwidth is less than 20 GHz.

8. The multi-wavelength laser system of claim 3 wherein:
the first output coupler is enclosed in a third thermo-mechanical housing; and
the second output coupler is enclosed in a fourth thermo-mechanical housing.

9. The multi-wavelength laser system of claim 3 wherein:
the first output light and the second output light are each characterized by greater than 50 longitudinal modes.

10. The multi-wavelength laser system of claim 3 wherein:
the first optical coupler is connected to the first output coupler; and
the second optical coupler is connected to the second output coupler.

11. The multi-wavelength laser system of claim 3 wherein no gain is present between:
the first output coupler and the spectral beam combiner; and
the second output coupler and the spectral beam combiner.

12. The multi-wavelength laser system of claim 3 wherein the first fiber laser is characterized by a first SBS spectral response width and a longitudinal mode spacing greater than the first SBS spectral response width.

13. A multi-wavelength laser system comprising:
a first fiber laser having a first cavity mirror enclosed in a first thermo-mechanical housing and a first output coupler;
a first optical coupler configured to receive light from the first output coupler;
a second fiber laser having a second cavity mirror enclosed in a second thermo-mechanical housing and a second output coupler;
a second optical coupler configured to receive light from the second output coupler; and
a spectral beam combiner configured to:
receive first output light from the first optical coupler, wherein the first output light comprises greater than 10 longitudinal modes;
receive second output light from the second optical coupler;
combine the first output light and the second output light; and
form a multi-wavelength output beam.

14. The multi-wavelength laser system of claim 13 wherein the first output light comprises between 100 and 300 longitudinal modes.

15. The multi-wavelength laser system of claim 14 wherein the first output light comprises approximately 200 longitudinal modes.

16. The multi-wavelength laser system of claim 13 wherein the first fiber laser and the second fiber laser are characterized by a bandwidth of less than or equal to 20 GHz.

17. The multi-wavelength laser system of claim 13 wherein the first output coupler is characterized by a bandwidth of less than or equal to 20 GHz and the first cavity mirror is characterized by a bandwidth between 20 GHz and 200 GHz.

18. The multi-wavelength laser system of claim 13 wherein the first cavity mirror is characterized by a bandwidth of less than or equal to 20 GHz and the first output coupler is characterized by a bandwidth between 20 GHz and 200 GHz.

19. The multi-wavelength laser system of claim 13 wherein:
the first cavity mirror is characterized by a first bandwidth centered at a first center frequency; and
the first output coupler is characterized by a second bandwidth centered at a second center frequency, wherein an overlap between the first bandwidth and the second bandwidth is less than 20 GHz.

20. The multi-wavelength laser system of claim 13 wherein:
the first output coupler is enclosed in a third thermo-mechanical housing; and
the second output coupler is enclosed in a fourth thermo-mechanical housing.

* * * * *